United States Patent
Lim et al.

(10) Patent No.: US 10,094,971 B2
(45) Date of Patent: Oct. 9, 2018

(54) OPTIC ASSEMBLIES AND FIXTURES COMPRISING THE SAME

(71) Applicant: Cree, Inc., Durham, NC (US)

(72) Inventors: Jin Hong Lim, Durham, NC (US);
Kurt Wilcox, Libertyville, IL (US);
Boris Karpichev, Libertyville, IL (US);
Donald Walker, Racine, WI (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/625,546

(22) Filed: Jun. 16, 2017

(65) Prior Publication Data

US 2018/0128961 A1 May 10, 2018

Related U.S. Application Data

(63) Continuation-in-part of application No. 15/347,413, filed on Nov. 9, 2016.

(51) Int. Cl.
| | |
|---|---|
| *F21V 8/00* | (2006.01) |
| *F21V 29/83* | (2015.01) |
| *F21V 23/00* | (2015.01) |
| *F21Y 115/10* | (2016.01) |

(52) U.S. Cl.
CPC .......... *G02B 6/0055* (2013.01); *F21V 23/007* (2013.01); *F21V 29/83* (2015.01); *G02B 6/002* (2013.01); *G02B 6/0031* (2013.01); *G02B 6/0036* (2013.01); *G02B 6/0068* (2013.01); *G02B 6/0083* (2013.01); *G02B 6/0085* (2013.01); *F21Y 2115/10* (2016.08)

(58) Field of Classification Search
CPC .. G02B 6/0055; G02B 6/0083; G02B 6/0085; G02B 6/0036; G02B 6/0068; G02B 6/002; G02B 6/0031; F21V 23/007; F21V 29/83; F21Y 2115/10
See application file for complete search history.

(56) References Cited

U.S. PATENT DOCUMENTS

| | | | | |
|---|---|---|---|---|
| 6,550,952 B1 * | 4/2003 | Hulse | ................... | G02B 6/0018 |
| | | | | 362/555 |
| 7,591,567 B2 * | 9/2009 | Wilcox | ...................... | F21V 7/06 |
| | | | | 362/297 |
| 8,033,693 B2 * | 10/2011 | Tan | ......................... | H01L 33/60 |
| | | | | 362/297 |
| D650,515 S * | 12/2011 | Bradley, Jr. | .................. | D26/118 |

(Continued)

OTHER PUBLICATIONS

International Search Report and Written Opinion, conducted by the ISA/US, corresponding to International Application No. PCT/US18/37301, dated Jul. 19, 2018, 7 pages.

*Primary Examiner* — Tracie Y Green
(74) *Attorney, Agent, or Firm* — J. Clinton Wimbish; Nexsen Pruet, PLLC

(57) ABSTRACT

In one aspect, optic assemblies and waveguide fixtures comprising the same are described herein. In an exemplary embodiment, an optic assembly includes an optic housing, an optical insert positioned in the optic housing, and a waveguide optic positioned in the optical insert. The waveguide optic includes a light extraction face and at least two sets of light extraction elements provided on the light extraction face. The at least two sets of light extraction elements are disposed on opposing sides of an axis of symmetry for extracting a symmetric lighting distribution.

49 Claims, 19 Drawing Sheets

(56) References Cited

U.S. PATENT DOCUMENTS

| | | | |
|---|---|---|---|
| 8,328,378 B2 * | 12/2012 | Chen | H01L 33/58 362/97.1 |
| 8,337,051 B2 * | 12/2012 | Hawkes | F21V 7/10 362/296.05 |
| 2009/0275157 A1 * | 11/2009 | Winberg | H01L 33/20 438/29 |

* cited by examiner

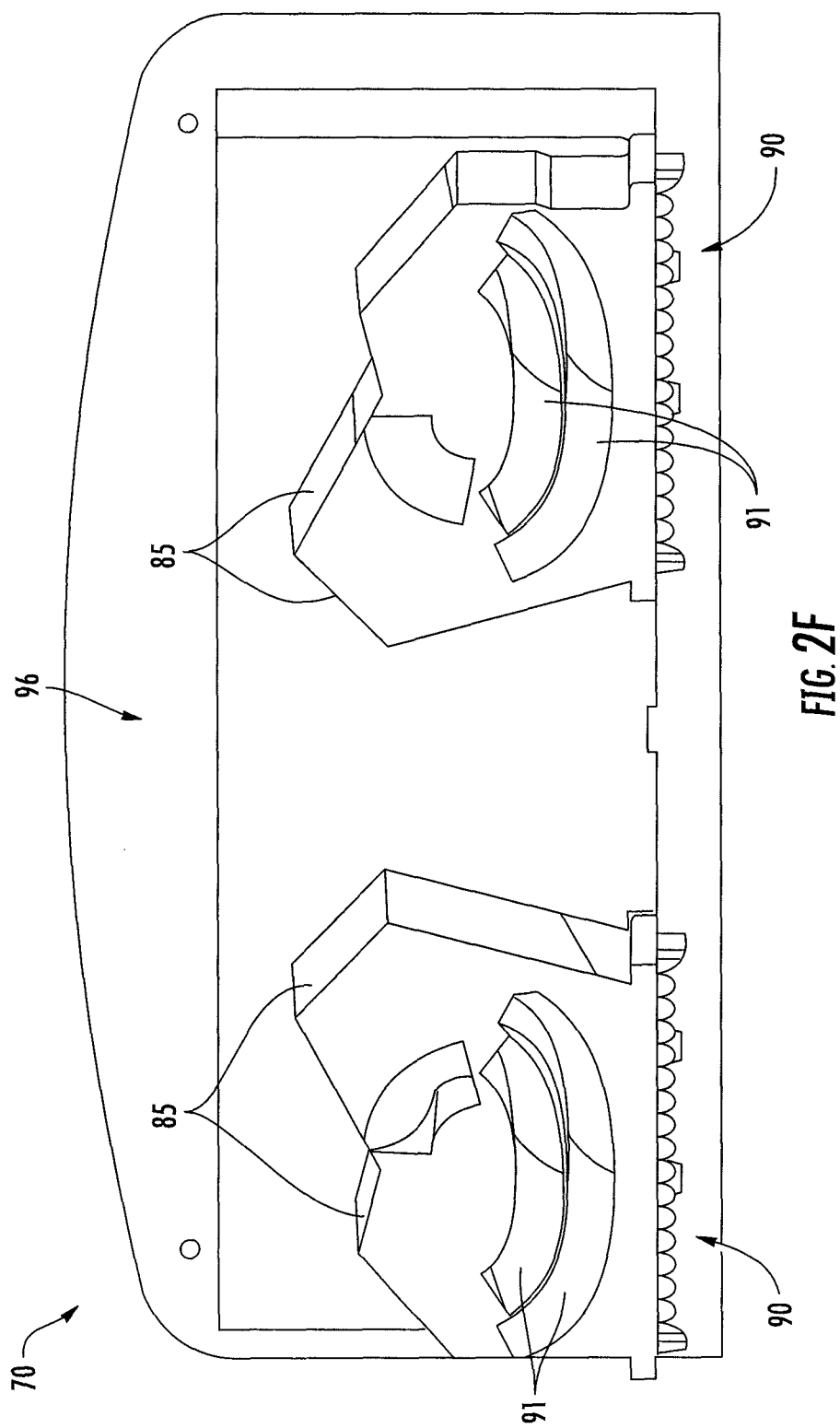

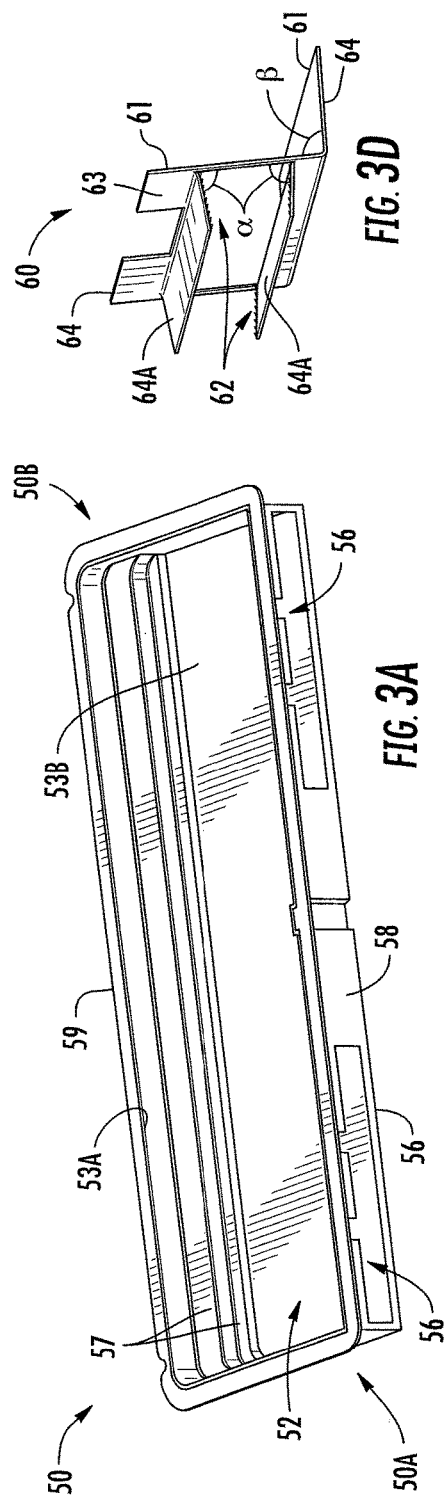
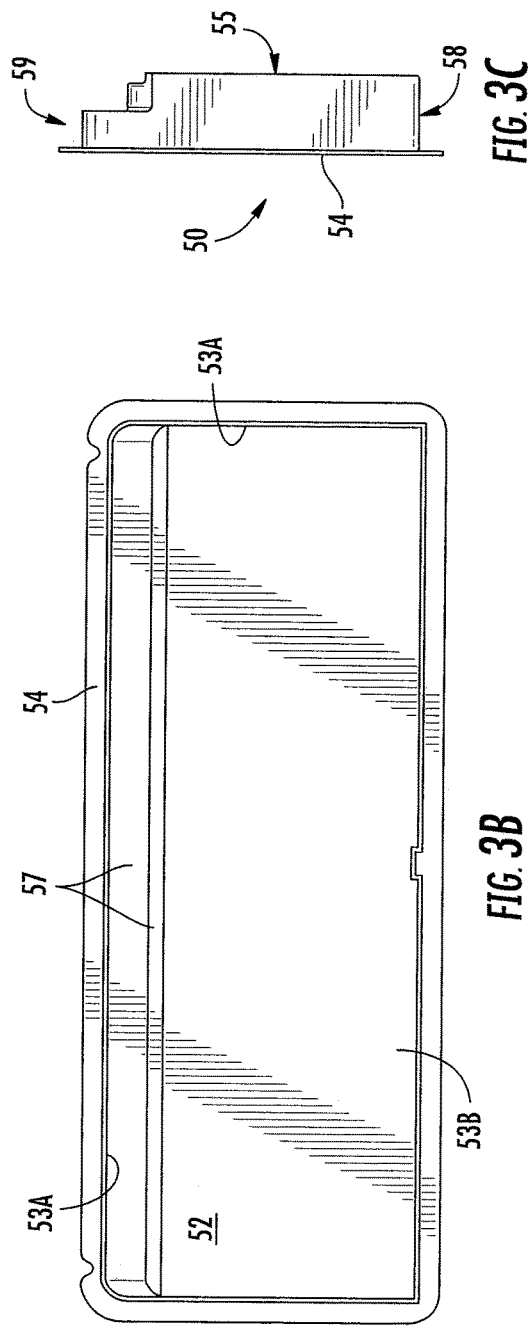

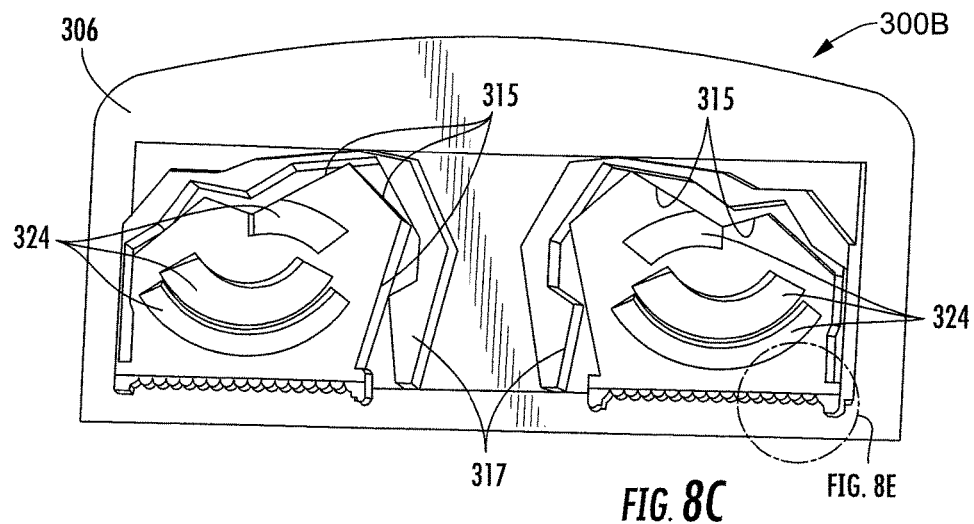
FIG. 8C
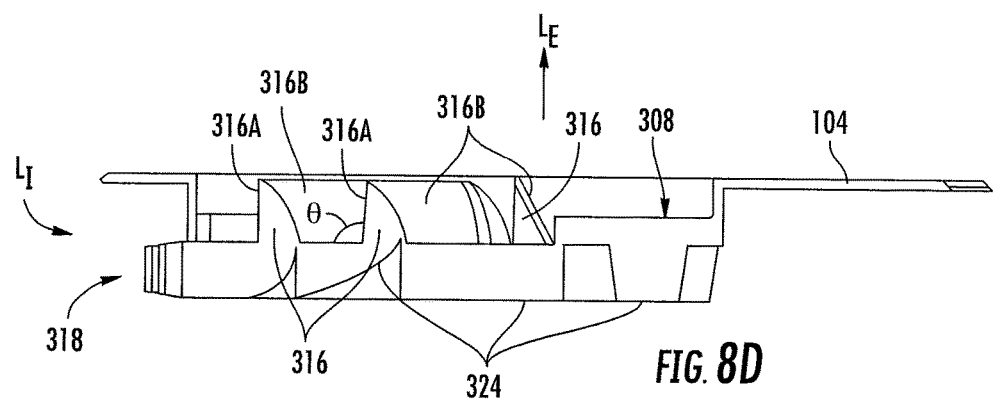
FIG. 8D
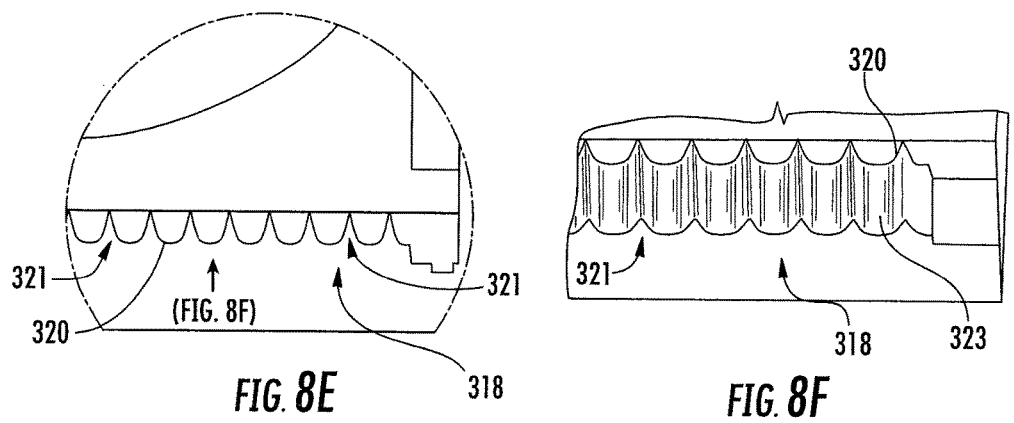
FIG. 8E
FIG. 8F

OPTIC ASSEMBLIES AND FIXTURES COMPRISING THE SAME

RELATED APPLICATION DATA

The present invention is a continuation-in-part pursuant to 35 U.S.C. § 120 to U.S. patent application Ser. No. 15/347,413 file Nov. 9, 2016.

FIELD

The present invention relates to optical devices and, in particular, to lighting devices employing optical inserts in conjunction with waveguide optics to provide desired light distributions.

BACKGROUND

A waveguide optic mixes and directs light emitted by one or more light sources, such as one or more packaged or unpackaged light emitting diode (LED) chips. A typical waveguide optic includes a waveguide body and one or more extraction elements. The extraction element(s) determine how light is removed by controlling where and in what direction the light exits the waveguide. By appropriately shaping waveguide surfaces, one can control the flow of light across the extraction element(s). Selecting the spacing, shape and other characteristic(s) of the extraction elements affects the appearance of the waveguide and its resulting angular distribution of emitted light and efficiency.

The ability to tightly control and shape the distribution of emitted light makes waveguide optics an attractive option for lighting fixtures. However, many lighting fixtures include standard or universal components designed to simplify manufacturing and enhance cost efficiencies. Lighting fixtures, such as sidewalk, roadway and/or parking lot fixtures, often employ a standard housing for optical components. In some cases, standard optical housings are incompatible with waveguide optics. For example, the standard housings can negatively alter the lighting distribution of a waveguide optic, thereby precluding use of the waveguide optic with the standard housing for a desired application. For example, a standard optic housing can be employed in roadside fixtures as well as fixtures mounted at or near the roadway center. Design of the standard optic housing may be compatible with waveguide optics providing a Type II or Type III distribution while disrupting waveguide optics of Type V distribution.

SUMMARY

In view of these disadvantages, waveguide optics and associated optic assemblies are provided which can provide desired lighting distributions including, but not limited to, high angle lighting distributions. In some embodiments, for example, lighting devices described herein comprise optic assemblies configured to emit symmetric distributions of light meeting the requirements of Type V lighting distributions from existing optic housing designs and form factors.

Briefly, a lighting device comprises an optic housing, an optical insert positioned in the optic housing, and a waveguide optic positioned in the optical insert. The waveguide optic includes a light extraction face and at least two sets of light extraction elements disposed over the light extraction face. The light extraction elements can include one or more non-linear segments, such as semi-elliptical or arcuate extraction segments. In some embodiments, the at least two sets of light extraction elements are disposed on opposing sides of an axis of symmetry. By extracting light using the optic assemblies described herein, the waveguide optic and reflective optical insert can emit a desired lighting distribution independent of optic housing design. The desired lighting distribution may include a symmetric distribution having a high output flux.

In another aspect, waveguide optics for optic assemblies are provided. A waveguide optic comprises a plurality of sidewalls, a light extraction face disposed between the plurality of sidewalls, and at least two sets of light extraction elements disposed over the light extraction face. As described herein, the light extraction elements of the sets can include one or more non-linear segments, such as semi-elliptical or arcuate extraction segments. Light extraction elements can receive light directly from a light input surface and/or from at least one light deflection surface of the waveguide optic. Moreover, the sets of light extraction elements can be positioned on opposing sides of an axis of symmetry. Alternatively, the sets of light extraction elements are asymmetrical relative to one another over the light extraction face.

In a further aspect, a waveguide optic of an optic assembly is provided. The waveguide optic generates a symmetric distribution of light via extracting light backwards (i.e., in a preferential direction towards a point of entry). The waveguide optic comprises a front face having a plurality of light extraction elements disposed therein and a rear face that is opposite the front face. An entrance geometry is defined between the front and rear face. A plurality of light emitting diodes (LEDs) faces the entrance geometry. The LEDs emit light towards the entrance geometry in a first direction, and the plurality of light extraction elements extract the light in a second direction that at least partially opposes the first direction.

These and other embodiments are described further in the following detailed description.

BRIEF DESCRIPTION OF THE DRAWINGS

FIGS. 2B-2F illustrate respective rear perspective, sectional, detail, and multiple perspective bottom views of an optic assembly of a lighting device according to some embodiments.

FIGS. 3A-3C illustrate respective rear perspective, top plan, and side views of an optical insert employed in the optic assembly according to some embodiments.

FIG. 3D illustrates a reflective sleeve provided as a separate piece for coupling with the optical insert according to some embodiments.

DETAILED DESCRIPTION

Figure 1A:
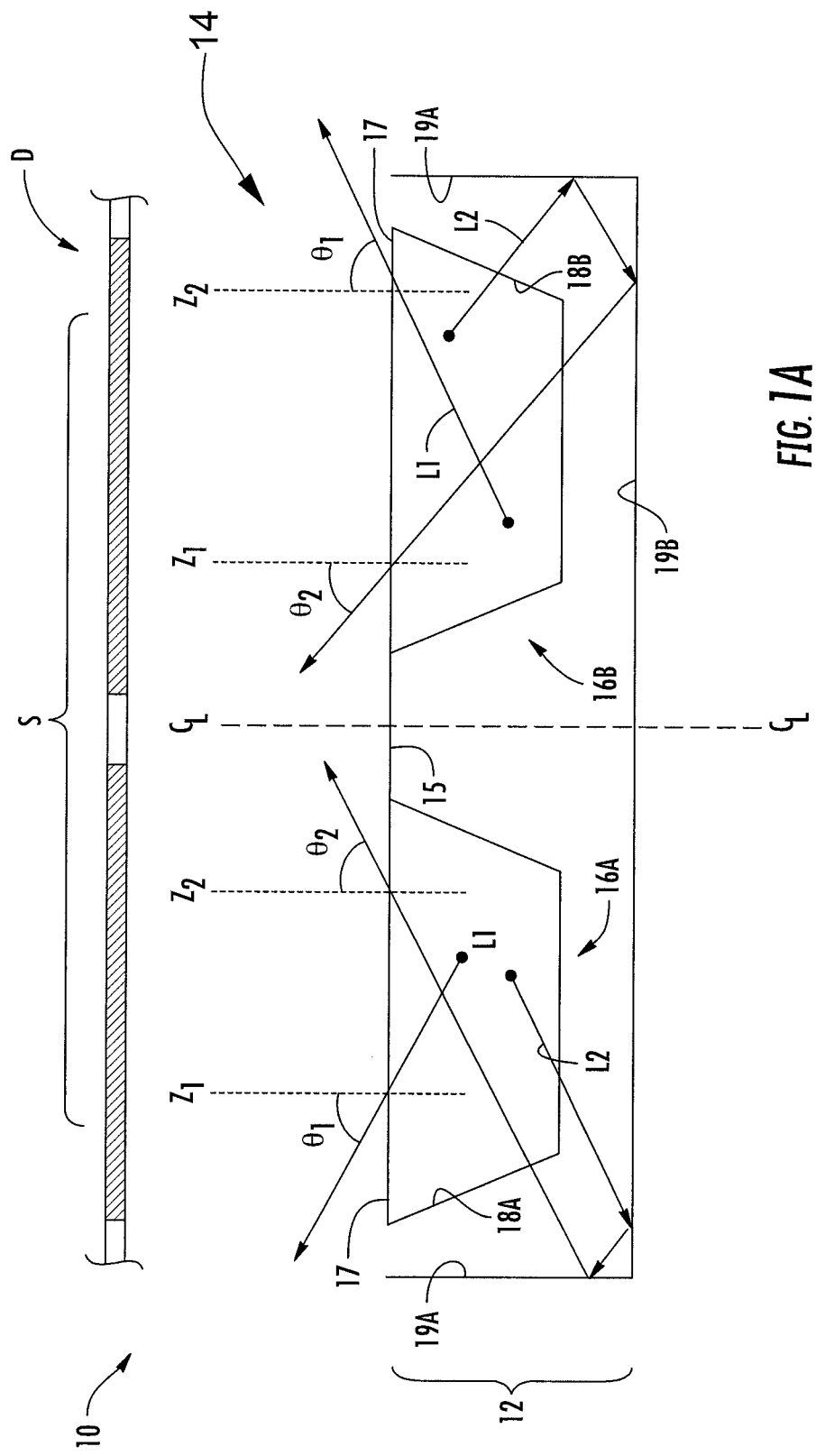
FIG. 1A illustrates redirection of light through a schematic waveguide optic by a reflective sidewall of an optical insert according to one embodiment.

Embodiments described herein can be understood more readily by reference to the following detailed description and examples and their previous and following descriptions. Elements, devices, and methods described herein, however, are not limited to the specific embodiments presented in the detailed description and examples. It should be recognized that these embodiments are merely illustrative of the principles of the present subject matter. Numerous modifications and adaptations will be readily apparent to those of skill in the art without departing from the subject matter disclosed herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the subject matter of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In one aspect, lighting devices are described herein. A lighting device employs an optic assembly comprising an optic housing, an optical insert positioned in the optic housing, and a waveguide optic positioned in the optical insert. Waveguide lighting fixtures comprise or are formed from the lighting devices descried herein. In some embodiments, the waveguide lighting fixtures and devices described herein are employed as outdoor lighting products for outdoor lighting applications.

A waveguide optic employed in lighting devices and fixtures comprises a light extraction face and at least two sets of light extraction elements disposed over the light extraction face. The light extraction elements can include one or more non-linear segments, such as semi-elliptical or arcuate extraction segments. As described further herein, light extraction elements can receive light directly from a light input surface and/or from at least one light deflection surface of the waveguide optic. A light deflection surface may support light redirection by total internal reflection. Alternatively, a light deflection surface may comprise a specularly reflective coating.

In some embodiments, the sets of light extraction elements are symmetrical with one another over the light extraction face. In being symmetrical, the waveguide optic can comprise one or more axes of symmetry. For example, two sets of light extraction elements can be positioned on opposing sides of at least one axis of symmetry. The two sets of light extraction elements can also be disposed on opposing sides of at least two axes of symmetry, one axis of symmetry being perpendicular to the light extraction face and another axis of symmetry being parallel to the light extraction face. Alternatively, the sets of light extraction elements can be asymmetrical relative to one another over the light extraction face.

The light passing through a given waveguide optic can be extracted at various angles depending on the desired distribution (e.g., Type V, Type VI, Type III, Type II, or others). In some embodiments, light is extracted from the waveguide optic at angles greater than 60 degrees relative to nadir for providing desired distributions of light. Light can also be extracted from the waveguide optic at angles less than 60 degrees relative to nadir for providing desired distributions of light. The lighting distributions emitted by waveguide optics herein can be symmetric about at least one axis of symmetry on a surface or plane opposing the extraction face and/or a front or top plane of the waveguide optic.

Notably, the waveguide optic in optic assemblies described herein is interchangeable, such that a single lighting device can be configured to emit lighting distributions meeting the requirements of Type II, Type III, Type IV, Type V and/or other types of lighting distributions. Thus, the optic assemblies described herein can enable use of multiple waveguide optics with an optical housing having a structure and/or design formerly considered incompatible with the intended light distribution from the waveguide optic. Accordingly, a standard or universal optic housing or optic box can be provided for optic assemblies of various applications where specific lighting distributions are controlled by selection of the waveguide optic and optical insert.

FIG. 1A illustrates redirection and extraction of light by a waveguide optic in conjunction with an optical insert according to some embodiments. In the embodiment of FIG. 1A, a lighting device 10 comprises an optical insert 12 and a waveguide optic 14 (also referred to as a "waveguide lens"). The waveguide optic 14 includes at least a first light extracting portion or region 16A and a second light extracting portion or region 16B connected by a waveguide body 15. The first and second light extracting regions 16A and 16B are symmetrically disposed about an axis of symmetry located along the centerline $C_L$ of device 10. Alternatively, first and second light extracting regions 16A and 16B are asymmetrical relative to one another over the light extraction face 17 and/or the centerline $C_L$ of device 10. The waveguide optic 14 is configured to extract light such that a resultant symmetric distribution D of light is emitted on or over a surface S that faces or opposes the extraction face 17 of the waveguide optic 14. Notably, the light distribution D is extracted at wide angles (i.e., >60°) and is rotationally symmetric in a top (plan) view.

As FIG. 1A further illustrates, the device 10 facilitates efficient light extraction, in part, by reflecting and/or redirecting stray or leaking rays of light through the waveguide optic 14 for extraction via light extraction regions 16A and 16B. The waveguide optic 14 includes an entrance geometry (not shown in this view) that separates light being emitted by a plurality of LEDs in two directions as it enters the optic 14. The separated light rays are collimated in each direction (i.e., as $L_1$, $L_2$) upon entering the optic 14. A first group of light $L_1$ is extracted directly by waveguide surfaces or elements of the waveguide optic at a first angle $\theta_1$, which is greater than about 60°. A second group of light $L_2$ (i.e., which is not initially extracted directly via light extraction regions 16A and 16B) is reflected and/or redirected by the optic insert 12. The second group of light $L_2$ is then redirected to the light extraction regions 16A and 16B and subsequently extracted at a second angle $\theta_2$, which is also a wide angle greater than about 60°.

In some aspects, the first group of light $L_1$ is directly extracted from the device 10 via reflective sidewalls or surfaces 18A, 18B of the respective first and second light extracting regions 16A and 16B. Such surfaces 18A and 18B may include, for example, surfaces of extraction elements, sidewalls, or facets disposed in the light extracting regions 16A and 16B. The first group of light $L_1$ exits the extraction face 17 of the waveguide optic 14 at a desired angle $\theta_1$ in a preferential direction.

Further, the second group of light $L_2$ is reflected by one or more reflective sidewalls 19A of the optic insert that surround the waveguide optic 14. The second group of light $L_2$ is reflected by the sidewalls 19A prior to extraction by the waveguide optic 14. The second group of light $L_2$ is then extracted from the waveguide optic 14 at desired angles $\theta_2$. The one or more reflective sidewalls 19A of the optical insert 12 can redirect light exiting surfaces or sidewalls of the waveguide optic back into the body for further redirection and extraction by surfaces of the extraction face 17. In certain embodiments, the insert sidewalls 19A are perpendicular or substantially perpendicular to a bottom floor or base 19B of the insert 12, which contributes to extraction of light at such wide angles. As described in more detail below, the optical insert 12 can also comprise one or more stepped or terraced walls (not shown in FIG. 1A), which are also perpendicular to the base 19B for improved extraction of light at wide angles. Further, and although not shown in this view, the waveguide optic 14 can also include one or more light redirection elements opposing the light extraction elements, which are also used to redirect light through optic 14.

The combined optical insert 12 and waveguide optic 14 are configured to emit a desired distribution D of light that is symmetric about at least one axis of symmetry. The distribution D of light may include light meeting the requirements of a Type II, Type III, Type IV, or Type V distribution, depending on the waveguide optic 14 and/or the optical insert 12 being selected and used. The light $L_1$, $L_2$ passes through the extraction face 17 of the waveguide optic 14 at the desired angles $\theta_1$, $\theta_2$ relative to a respective axis $Z_1$, $Z_2$ that is normal to the extraction face 17.

In some embodiments, the one or more reflective sidewalls 19A direct a first portion of the light to pass through the extraction face 17 at desired angles while also redirecting a second portion of light back into the waveguide body for further redirection and extraction by surfaces (e.g., element surfaces, facets, sidewalls, etc.) of the extraction face 17. The reflective sidewalls 19A of the optical insert 12 can redirect light emitted from portions of the waveguide optic 14 to provide peak emission from the lighting device 10 at angles ($\theta_1$, $\theta_2$) greater than 60 degrees relative to nadir or less than 60 degrees relative to nadir.

As described in more detail below, one or more light extraction elements are arranged on, over, and/or in the light extracting regions 16A, 16B of the waveguide optic 14. The extraction elements include reflective surfaces or faces, which, in some aspect are specularly reflective or provide total internal reflection (TIR) of light. Some light rays encounter the extraction elements of the waveguide optic and become extracted from the extraction face directly by virtue of meeting the TIR requirements. Light rays failing to meet the TIR requirements can leak out of the waveguide optic and be redirected through the waveguide optic via the optical insert, housing, and/or redirection facets or elements disposed on a lower/rear portion of the waveguide optic. An optional recycling feature may also be disposed on a lower (rear) face of the waveguide optic 14 for redirecting leaking light rays back to the upper (front) face for extraction by the extraction elements.

Arrangement of extraction elements in the light extracting portions or 16A, 16B of the waveguide optic 14 can be governed by several considerations including but not limited to, the shape of the desired lighting distribution D, the size of the desired lighting distribution D, the desired luminous output, and/or the location or position of the desired lighting distribution D relative to the position of device 10. The extraction elements disposed in light extracting regions 16A and 16B may include linear elements, non-linear elements, or combinations of linear and non-linear elements (i.e., as viewed in a plan view in the plane of the extraction face). Where used, the non-linear elements may be substantially curved, elliptical, semi-elliptical, rounded, semicircular, helical, arcuate, arranged in regular shapes, and/or arranged in irregular shapes. The faces of the linear and non-linear elements may be tapered, curved, faceted, non-faceted, and/or substantially vertical (i.e., orthogonal) relative to the light extraction face. The arrangement of elements in each light extracting region 16A and 16B may be asymmetric, symmetric about at least one line of symmetry, symmetric about at least two lines of symmetry, or symmetric about more than two lines of symmetry.

The optical insert 12 is disposed around the waveguide optic 14, fully or partially, and is positioned in between the waveguide optic 14 and an optic housing (also referred to as an "optic box"). The optical insert 12 is comprised of reflective sidewalls 19A and a reflective base 19B that collectively form a reflective compartment configured to receive the waveguide optic 14. Arrangement of the reflective sidewalls 19A of the optical insert 12 relative to sidewalls of the waveguide optic 14 can be governed by several considerations including, but not limited to, the shape and light distribution properties of the waveguide optic 14, various structural and design features of the optic housing, and/or the desired light distribution of the lighting device 10.

In some embodiments, for example and as described in detail below, the optic housing comprises one or more reflective walls and base surfaces that work in conjunction with reflective sidewalls 19A and base 19B of the optical insert 12. In such embodiments, the optical insert 12 need not include reflective sidewalls that overlap with reflective surfaces or structures of the optical housing. For example, the optical housing can comprise a reflective base wall and/or sidewalls that work in conjunction with the reflective sidewalls 19A of the optical insert 12 to redirect light exiting the waveguide optic 14.

Figure 1C:
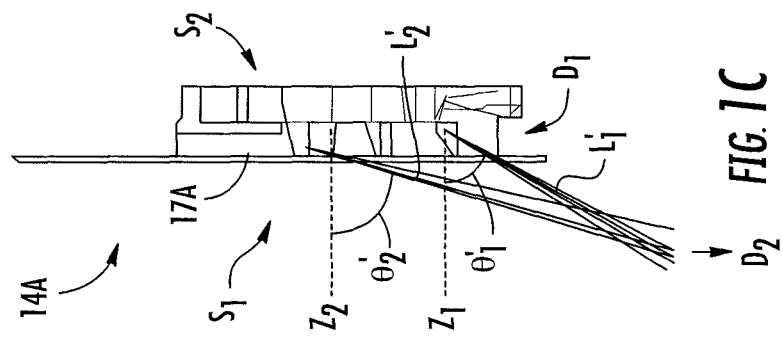
FIGS. 1B-1G illustrate redirection and extraction of light through a waveguide optic according to some embodiments.
Figure 1B:
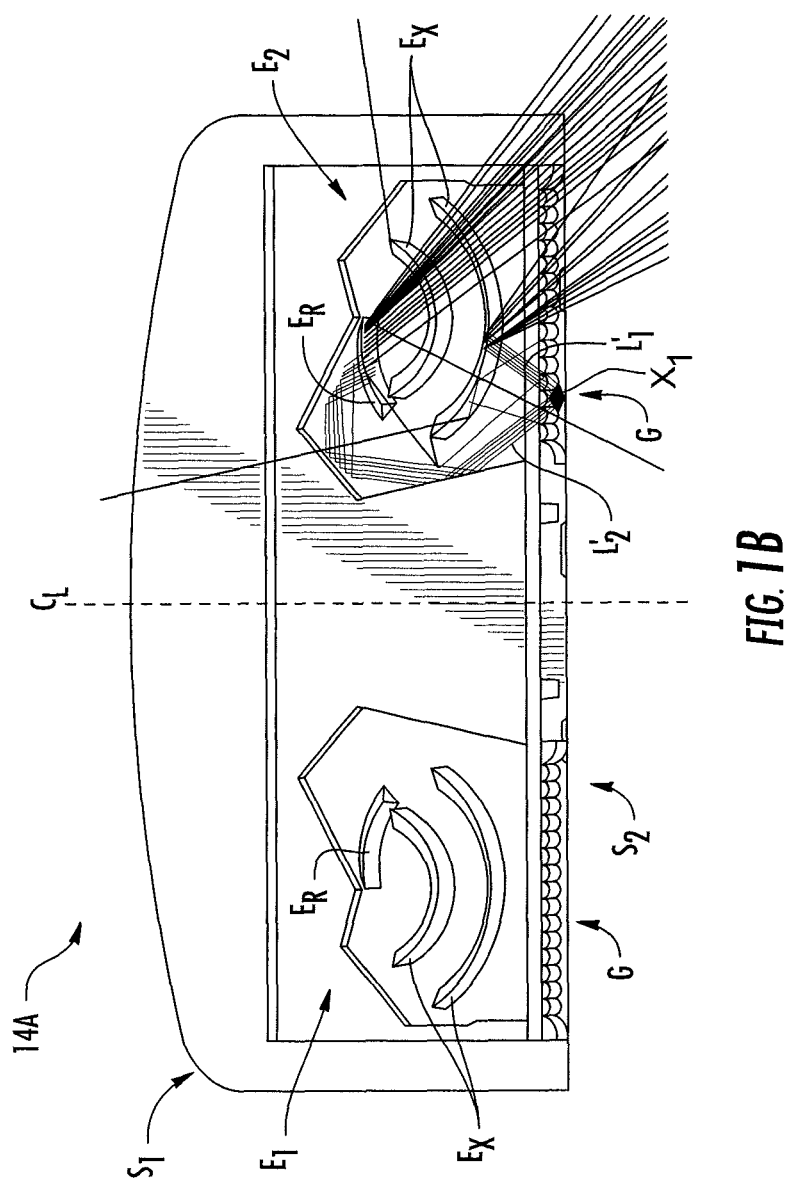

FIGS. 1B-1C illustrate respective front perspective and sectional views of a waveguide optic, generally designated 14A, which illustrates redirection and extraction of light entering the optic at a first entry point X1. FIGS. 1D-1G illustrate respective front perspective, rear perspective, side, and sectional views of the waveguide optic 14A, which illustrates redirection and extraction of light entering the optic at a second entry point $X_2$. The redirection and extraction of light is shown for one-half of the optic 14A in FIGS. 1B to 1G for illustration purposes only, so that the remaining features of the optic 14A in the various views are visible and unobstructed. As FIGS. 1B-1G illustrate, light entering the optic at different points (i.e., $X_1$, $X_2$) can be extracted at different angles. The overall pattern of light extracted by opposing light extraction regions E1 and E2 is symmetric.

Referring now in general to FIGS. 1B and 1C, the waveguide optic 14A comprises a front face or side $S_1$ and a rear face or side $S_2$ opposite the front side. A plurality of light extracting regions is defined on, over, and/or within the front side $S_1$ of the waveguide optic 14A. For example, at least a first light extracting region $E_1$ and a second light extracting region $E_2$ are formed and/or otherwise defined in the first side $S_1$ of the waveguide optic 14A. Each of the first and second light extracting regions $E_1$, $E_2$ comprises one or more light extracting features or elements $E_X$.

Notably, the first and second light extracting regions $E_1$ and $E_2$ are symmetrically disposed about at least one axis of symmetry located along the centerline $C_L$ of optic 14A. The individual light extracting elements $E_X$ are also symmetrically disposed about the axis of symmetry located along the centerline $C_L$. In alternative embodiments, the first and second light extracting regions $E_1$ and $E_2$ and/or the extracting elements $E_X$ in each region are asymmetrical relative to one another over the first side $S_1$ of the optic 14A.

The waveguide optic 14A is configured to extract a symmetric distribution of light by virtue of the symmetrically disposed extracting elements $E_X$ in regions $E_1$ and $E_2$. Notably, the waveguide optic 14A is configured to extract a symmetric distribution of light at wide angles (i.e., >60°), so that the resultant distribution is rotationally symmetric in a plan view. As FIG. 1B further illustrates, light is emitted by a light source (e.g., an LED, not shown) and enters the waveguide optic 14A at a first entry point $X_1$, where the light is separated into two portions and two directions via the entrance geometry G of the optic 14A. The entrance geometry is disposed between and/or defined between the first and second sides $S_1$, $S_2$ of the optic. The light entering the optic 14A is collimated on a horizontal plane and symmetrically extracted (e.g., backwards) on a vertical plane at wide angles. The entrance geometry G has a plurality of light input surfaces that are substantially or generally parabolic or wedge-shaped in cross-section, so that the LED light is separated evenly in two different portions and directions as it enters the waveguide optic.

A first group (portion) of light $L'_1$ propagating through the waveguide optic 14A is extracted in a backward direction (i.e., backward relative to the direction it enters the optic), directly, by a first, non-linear (e.g., curved) extracting element $E_X$. A second group (portion) of light $L'_2$ propagating through the waveguide optic 14A is reflected and/or redirected through the optic prior to extraction. For example, the second group of light $L'_2$ may include stray and/or leaking rays of light that propagate through the optic via reflection and/or redirection by one or more TIR surfaces of one or more light redirecting elements (facets) formed in the optic 14A. Alternatively, the second group of light $L'_2$ may be reflected and/or redirected by the optical insert (i.e., 12, FIG. 1A) that encases the waveguide optic 14A. The waveguide optic 14A may include one or more redirecting facets on the rear side $S_2$ of for directing the second group of light $L'_2$ back towards the extracting elements $E_X$ on the front side $S_1$ for backward extraction. Each extracting region $E_1$ and $E_2$ may include an optional rear facing element $E_R$ that is oppositely curved and/or oriented with respect to the remaining extraction elements, for the efficient backward extraction of light $L'_2$. That is, the rear facing elements $E_R$ facilitate efficient backward extraction of light to a specific direction (i.e., a preferential direction) on the horizontal plane.

As FIG. 1C illustrates, the waveguide optic 14A further comprises an extraction face 17A formed in the front side $S_1$ thereof. Notably, light enters the optic 14A in a first direction D1, and is extracted from the extraction face 17A in a second, preferential direction D2, which is opposite and/or directed substantially backwards relative to the first direction D1. The light is extracted at wide angles $\theta'_1$, $\theta'_2$ that are greater than about 60°. The waveguide optic 14A is configured to direct light towards the preferential direction D2, which is at least somewhat back towards the first point of entry $X_1$ (FIG. 1B). Light enters the optic 14A proximate the first point of entry $X_1$, such that some of the light is directly extracted (e.g., $L'_1$) in the preferential direction D2 and other light (e.g., $L'_2$) is redirected prior to extraction in the preferential direction D2.

FIGS. 1D-1G illustrates the extraction of light entering the waveguide optic 14A at a second entry point $X_2$ that is different than the entry point shown in FIGS. 1B and 1C. Light entering the waveguide optic 14A at the second entry point $X_2$ is separated into different portions of light being aimed in different directions by the entrance geometry G. For example, a first portion of light $L''_1$ propagating through the waveguide optic 14A is directly extracted by a light extracting element $E_X$. A second portion of light $L''_2$ propagating through the waveguide optic 14A is redirected through the optic 14A prior to extraction. The second portion of light $L''_2$ can be redirected by at least one light redirecting element or facet (i.e., $R_{F1}$, FIG. 1E) prior to extraction by one of the light extracting elements $E_X$.

Figure 1D:
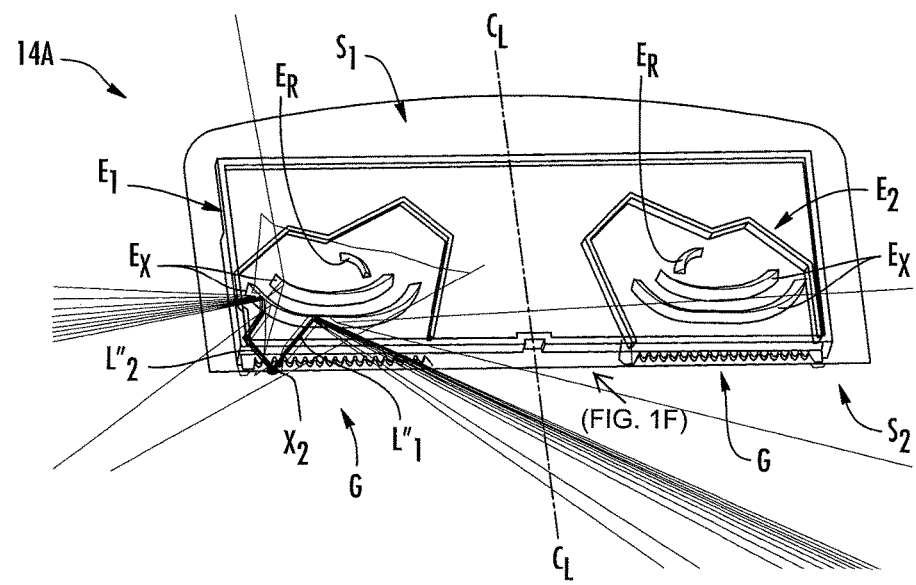
Figure 1E:
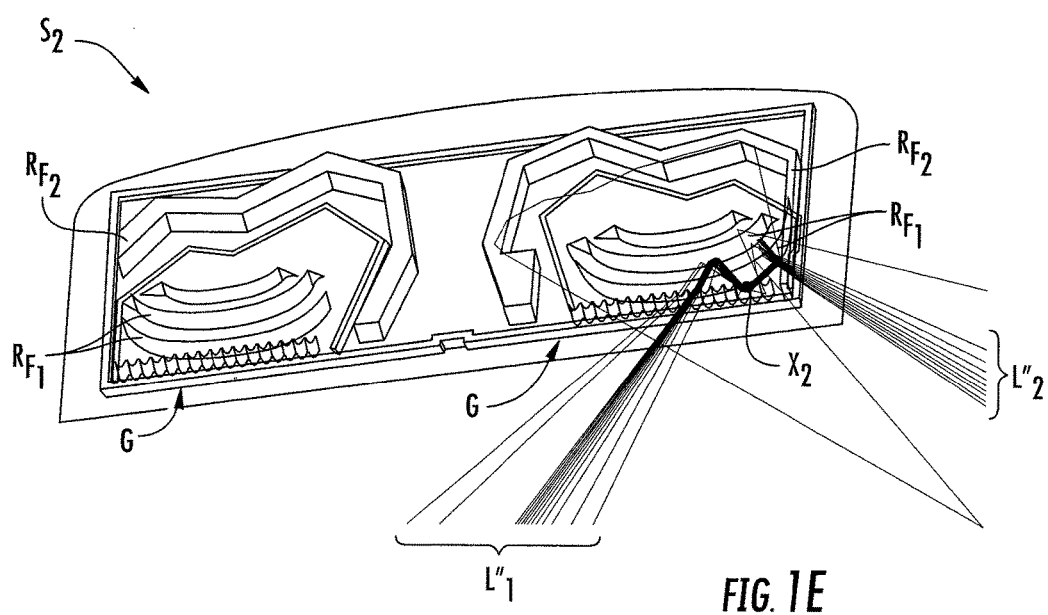

FIG. 1E is a rear face or side $S_2$ of the optic 14A that opposes the first, front side $S_1$. A plurality of light redirecting facets $R_{F1}$ (also referred to as light redirecting elements) are disposed on or over the second side $S_2$. An optional recycling feature $R_{F2}$ may also be disposed around portions of the redirecting facets $R_{F1}$. The light redirecting facets $R_{F1}$ and recycling feature $R_{F2}$ can collectively redirect rays of light through the optic 14A via reflection and/or redirection of the light by one or more TIR surfaces thereof. That is, least some of the second portion of light $L''_2$ can propagate to the rear side $S_2$ and be redirected from the rear side $S_2$ to the front side $S_1$ via TIR surfaces of redirecting facets $R_{F1}$ and/or recycling feature $R_{F2}$. The redirected light is then extracted from the optic 14A via light extracting elements $E_X$. Notably, at least some of the light (i.e., the first $L''_1$ or second portion $L''_2$ of light) is extracted at least partially backwards in a direction aimed back towards entrance geometry G and second point of entry $X_2$.

Figure 1F:
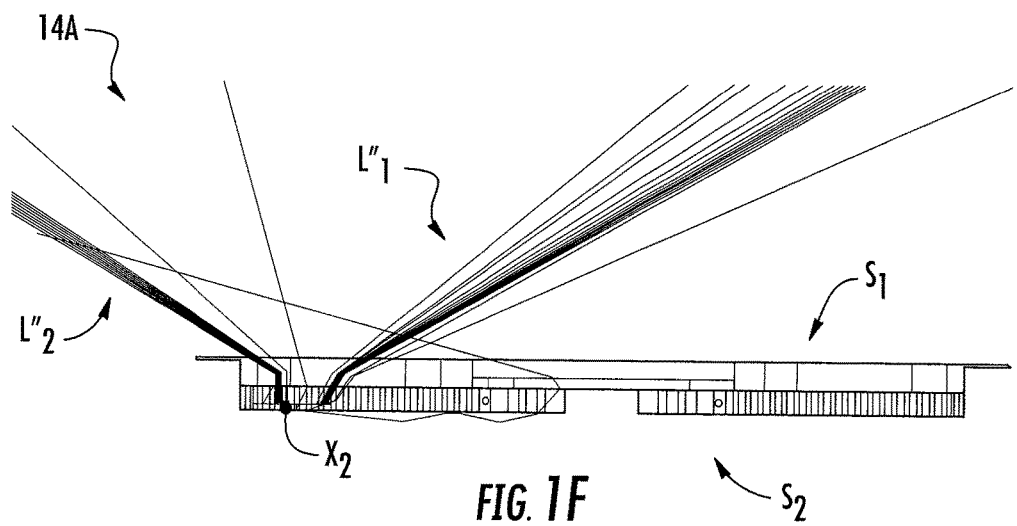
Figure 1G:
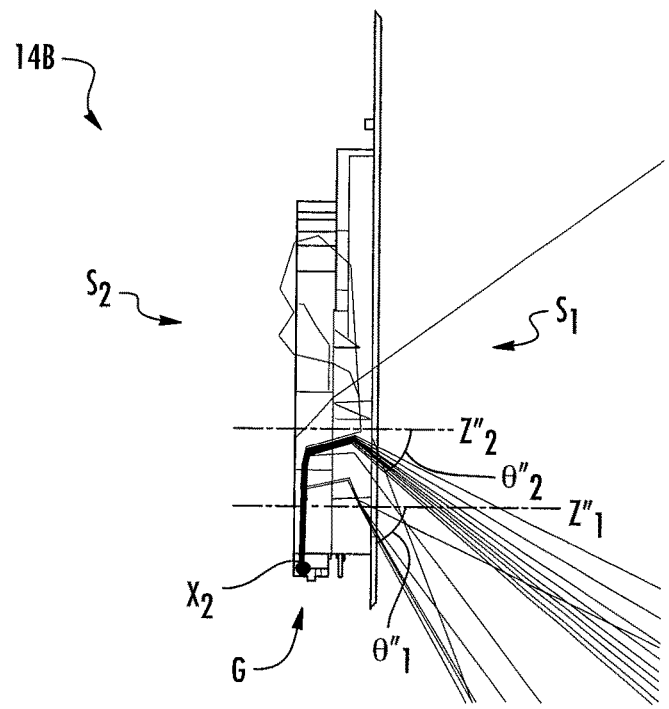

FIG. 1F is a side view of the optic 14A as viewed along the direction indicated in FIG. 1D and FIG. 1G is a sectional view of the optic 14A. As these figures collectively illustrate, the waveguide optic 14A is configured to extract wide angles (i.e., >60°) of light, so that the resultant distribution is rotationally symmetric in a plan view. Light entering the optic 14A at the second entry point $X_2$ of the entrance geometry G is extracted from the first side $S_1$ of the optic in a preferential direction, which is at least partially backwards relative to the entrance geometry G and second entry point $X_2$. The light is extracted at wide angles $\theta''_1$, $\theta''_2$ that are greater than about 60 relative to a respective axis $Z''_1$, $Z''_2$ that is normal to the extraction face of the optic 14A. Light enters the optic 14A proximate the second entry point $X_2$. Some of the light is directly extracted (e.g., first portion $L''_1$) in the preferential direction via extracting elements $E_X$, while other light (e.g., second portion $L''_2$) is redirected via redirecting or recycling elements (i.e., $R_{F1}$, $R_{F2}$) disposed on the second side $S_2$ of the optic 14A prior to extraction in the preferential direction.

In some embodiments, the waveguide optics, devices, and fixtures described herein are configured to emit light having a distribution that meets the requirements of a Type V distribution and an output of at least 24,000 lumens for street and area lighting applications. That is, a single lighting device or fixture can emit a Type V distribution having an output of at least 24,000 lumens. The waveguide optic is interchangeable in the fixture, and can also be used in a housing that also supports optics emitting light meeting the requirements of Type II, Type III, and/or Type IV distributions. The waveguide optics and optical inserts described herein emit specific lighting distributions, and are employed in optic assemblies that are further comprised of one or more (optional) reflective sleeves and/or an optic housing. The sleeves match the waveguide entrance geometry (e.g., a wedge or parabolic shape) for facilitating improved optical performance and efficiency by directing escaping light rays back into the waveguide optic.

Further, light emitting diode (LED) chips, packages, or components (i.e., generally referred to as "LEDs") are coupled to the optic assembly at multiple light coupling regions of the waveguide optic. The light coupling regions include an entrance geometry comprised of one or more parabolic or wedge-shaped light input surfaces. The assembly will emit a symmetric distribution of light in a plane perpendicular to the light coupling faces, or portions thereof, where the rays of light are extracted orthogonally with respect to the light input surfaces via extraction facets of the extraction elements of the waveguide optic.

The combination of the TIR surfaces of the extraction elements, the redirection elements or facets, and the optic insert can improve the optical distribution. The overall optical efficiency increases with increasing reflectance of insert. For example, an insert having a reflectance of greater than 97% gives an overall optical efficiency about 88%. The reflection of light by the TIR surfaces of the extraction elements and the redirection and re-reflection of light via redirection elements and/or the optical insert increases the overall efficiency of the waveguide optic and devices employing the same to at least 85-99.9%, or any subrange therebetween (e.g., an efficiency of 85-95%, 94-98%, 92-98%, etc.). The overall efficiency is a percentage calculated by dividing the amount of light extracted from the waveguide optic by the amount of light injected into the waveguide optic.

The high output flux provided by the devices and fixtures described herein can further be attributed to at least two groups of LEDs. Each group of LEDs is provided in an array facing a respective light extracting region of the waveguide optic. The groups of LEDs and light extracting regions can be symmetrically disposed (i.e., symmetric) about at least one axis of symmetry for providing a symmetric distribution of light. Alternatively, groups of LEDs are asymmetrical relative to a centerline of the device. More than two groups of LEDs and light extracting regions may be provided per lighting device and/or fixture as described herein. For example, two groups of LEDs and light extracting regions may be provided per waveguide optic, three groups of LEDs and light extracting regions may be provided per waveguide optic, four groups of LEDs and light extracting regions may be provided per waveguide optic, etc. In certain embodiments, an even number (i.e., numbers that are a multiple of two) of groups of LEDs and light extracting regions are provided per waveguide optic.

The light entering the waveguide optic is separated into two directions via the entrance geometry of each light coupling region. The light is collimated on a horizontal plane and symmetrically extracted on a vertical plane at wide angles. The entrance geometry has a plurality of light input surfaces that are substantially or generally parabolic or wedge-shaped in cross-section, so that the LED light is separated evenly in two different directions as it enters the waveguide optic. The separated light rays are collimated in each direction. In some embodiments, the parabolic or wedge-shaped portions of the entrance geometry have a plurality of segments or facets so that the light can be more efficiently collimated.

The waveguide optics described herein comprise and be formed from any suitable optical material consistent with the instant disclosure, such as, for example, acrylic (polymethyl methacrylate (PMMA)), nylon, polycarbonate, polyurethane, silicone, glass, cyclic olefin copolymers, synthetic polymers, an optical liquid and/or combinations thereof, possibly in a layered or laminate arrangement, for achieving a desired effect and/or appearance. The waveguide optics may be formed as a lens via molding (e.g., injection molding), 3D printing, extruding, or any other suitable process consistent with the instant disclosure. Further and in certain embodiments, the waveguide optics described herein are formed from transparent materials, whereby the extraction, reflection, and/or redirection of light in and/or through the optics occurs by TIR. Alternatively, surfaces of one or more of the extraction, reflection, and/or redirection features may be made specularly reflective, for example, by adding an (optional) specularly reflective sheet of material or deposition of a metal, where desired. The waveguide optics described herein can be between 5 and 50 mm thick, or any subrange therebetween (e.g., between 5 and 10 mm thick, between 10 and 15 mm thick, between 10 and 20 mm thick, etc.). In certain embodiments, the waveguide is at least 12 mm thick for accommodating multiple rows of light emitters.

The foregoing architectures and operational principles of the waveguide optic, associated optical insert and optic housing are further described with reference to the non-limiting embodiments illustrated in FIGS. 2A-9C.

Figure 2A:
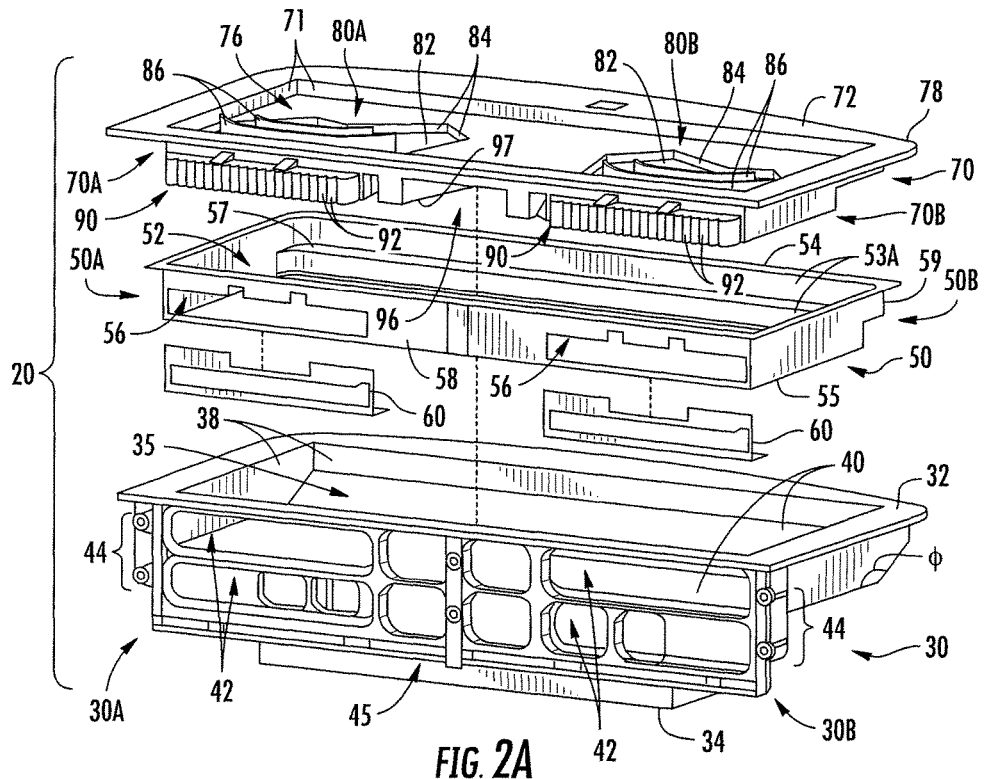
FIG. 2A illustrates an exploded view of an optic assembly of a lighting device according to some embodiments.

FIG. 2A is an exploded view of an optic assembly generally designated 20 of a lighting device according to some embodiments. The optic assembly 20 comprises an optic housing 30, an optical insert 50, optional sleeves 60, and a waveguide optic 70. Notably, the waveguide optic 70 includes a plurality of light extracting regions 80A, 80B. In some embodiments, the waveguide optic 70 includes symmetric light extracting regions 80A, 80B configured to extract a symmetric distribution of light. Alternatively, the sets light extracting regions 80A, 80B are asymmetrical relative to one another over the waveguide optic 70. The waveguide optic 70 and/or optical insert 50 are interchangeably disposed (e.g., interchangeable singly or combined) in optic housing 30 so that a single assembly 20 can advantageously emit different lighting distributions including, but not limited to, Type II, Type III, Type IV, and Type V lighting distributions.

Turning now specific components of optic housings 30 described herein and referring to FIGS. 2A-2F, the optic housings 30 comprise an upper face 32, a lower face 34 and a compartment 35 defined therebetween. The upper face 34 is configured to contact and/or engage portions of the optical insert 50. The lower face 34 is configured to contact and/or engage portions of a lighting fixture (see e.g., FIG. 9B).

The compartment 35 is configured to receive the optical insert 50 and is comprised of one or more sidewalls 38 and a base wall 40. The sidewalls 38 and base wall 40 can be, but do not have to be diffusely reflective, specularly reflective, or a combination of diffusely and specularly reflective materials. In some embodiments, the base wall 40 is a single, continuous wall that is orthogonal to the upper face 32 of the housing and is referred to as a "flat" housing. In other embodiments, the base wall 40 is comprised of multiple walls or wall segments, each wall being disposed at one or more angle(s) Φ with respect to at least one other wall and the upper face 32. In this embodiment, the optic housing 30 and is referred to as "rear wedged" housing. Housing 30 can comprise a flat housing or a rear wedged housing for conforming to the size(s) and/or shape(s) of the insert 50 and/or waveguide optic 70 collectively positioned therein.

The optic housing 30 can comprise one or more sidewall apertures 42 disposed in a first side or end 30A of the housing or more sidewall apertures 42 disposed in a second side or end 30B of the housing. The sidewall apertures 42 are configured to receive portions of a light coupling region 90 therethrough, so that LEDs (i.e., 420, FIG. 9B) can interface with the light coupling region 90 as described in more detail below.

The optic assembly 20 can be attached and/or secured to a lighting fixture (i.e., 400, FIGS. 9A-9C) via interfacing one or more fasteners with one or more of a plurality of side connecting regions 44 and a center connecting region 45 of housing 30. For example, side and central connecting regions 44, 45 can comprise threaded or non-threaded bores for receiving and securing one or more pins, screws, bolts, or other types of fasteners therein thereby securing the optic assembly 20 to a fixture (i.e., 400, FIG. 9A).

Turning now specific components of optical inserts 50 described herein and still referring in general to FIGS. 2A-2F, such inserts 50 can be positioned in the compartment 35 of optic housing 30. The optical insert 50 comprises a compartment 52 configured to receive the waveguide optic 70. The compartment 52 is defined between a top surface 54 and a bottom surface 55 and between a front face 58 and a rear face 59. The compartment 52 is further defined by a plurality of reflective sidewalls 53A and a reflective base wall (i.e., 53B, FIG. 3A). The reflective sidewalls 53A and reflective base wall 53B (i.e., 53B, FIG. 3A) define a reflective compartment in which the waveguide optic 70 is positioned.

The optical insert 50 can further comprise one or more sidewall apertures 56 disposed in a first side or end 50A of the insert and one or more sidewall apertures 56 disposed in a second side or end 50B of the insert. The sidewall apertures 56 permit light coupling regions 90 of the waveguide optic 70 to interface with a light source, such as a plurality of LEDs (i.e., 420, FIG. 9B). The light coupling region 90 of the waveguide optic 70 can extend through each sidewall aperture 56 and interface directly with the LEDs (i.e., 420, FIG. 9B).

Further, the reflective sidewalls 53A of optical insert 50 include ledges or terraces 57 that match the external surfaces and/or sidewall arrangement of the waveguide optic 70. Terracing the reflective sidewalls 53A can enable the insert 50 to efficiently maximize the use of narrow and/or limited space between the optic housing 30 and waveguide optic 70 while maintaining desired lighting distributions and optical performance. Terracing the reflective sidewalls 53A also provides a variety of design options when single or non-terraced reflective wall(s) are not suitable or incompatible with structural features of the optic housing 30 and/or waveguide optic 70. Terracing the reflective sidewalls positions the sidewalls perpendicular to the reflector floor so that the light rays can travel in wide angles (e.g., $\theta_1$ and $\theta_2$, FIG. 1A) during extraction. For example, terracing the reflective sidewalls advantageously provides light rays in a wide v-angle on the top of waveguide optic. This feature maximizes use of the narrow space between the waveguide optic and optic insert while maintaining the large v-angle. As noted above, two or more groups of light rays propagate through the waveguide optics and devices described herein in a wide V-angle for extraction. One group of light rays is extracted from the waveguide directly, without encountering the optic insert. The other group of light rays is made up of escaping or reflected rays, which encounter optic insert and are redirected by the terraced sides.

In some embodiments, the optical inserts 50 comprise one or more specular reflector films disposed on or over the reflective sidewalls 53A and/or base wall (53B, FIG. 3A), including ESR films. Such films are commercially available from 3M of St. Paul, Minn. In other embodiments, an optical inserts described herein can be thermoformed directly from a specularly reflective sheet. Optical inserts 50 may also be thermoformed from non-specularly reflective materials, such as from a thermoplastic sheet, and subsequently metallized to provide specularly reflective sidewall(s) and base wall. Suitable metals for metallization processes include silver and aluminum.

In further embodiments, reflective sidewalls 53A and/or the reflective base (i.e., 53B, FIG. 3A) can be formed of a combination of specularly reflective sheets and metallized surfaces. For example, reflective sidewalls 53A of the optical insert can comprise metallized surfaces while the base wall (i.e., 53B, FIG. 3A) and reflective sleeves 60 comprise ESR film. Any combination of the metallized surfaces and specularly reflective film are contemplated for the optical insert. Specific features and elements of the optical insert 50 are detailed in U.S. patent application Ser. No. 15/347,413 entitled "Optical Inserts and Waveguide Fixtures Comprising the Same" by Lim et al., which is incorporated herein by reference in the entirety.

The waveguide optic 70 is positionable in the optical insert 50. The waveguide optic 70 comprises a waveguide body 72 and a light extraction face 76 disposed on, over, and/or within portions of the body 72. The light extraction face 76 forms an upper or front face of the waveguide optic 70 and is disposed between a plurality of sidewalls 71. The waveguide optic 70 further comprises a light redirecting face 96 opposite the light extraction face 76, which forms a lower or rear surface. The size and shape of light extraction face 76 is defined by the plurality of sidewalls 71. The waveguide optic 70 includes at least a first light extracting block or region 80A located proximate a first side or end 70A of the optic and a second light extracting block or region 80B located proximate a second side or end 70B of the optic. The first and second light extracting regions 80A and 80B are connected to each other by the waveguide body 72. For example and in some embodiments, the waveguide body 72 includes a flange that connects the first and second light extracting regions 80A and 80B, respectively.

Still referring to FIGS. 2A-2F in general, the waveguide optic 70 further comprises a light coupling region 90 disposed on opposing ends 70A, 70B of the optic. Each light coupling region 90 opposes, faces, and/or is disposed proximate a respective light extracting region 80A, 80B of the optic. For example, a first light coupling region 90 opposes, faces, and/or is located proximate the first light extracting region 80A and a second light coupling region 90 opposes, faces, and/or is located proximate the second light extracting region 80B. Each light extracting region 80A, 80B comprises a plurality of light extraction elements 86. The first light coupling region 90 is disposed proximate a first set $S_1$ (FIG. 2B) of light extraction elements 86 and a second light coupling region 90 is disposed proximate a second set $S_2$ (FIG. 2B) of light extraction elements 86. More than two light extracting regions (i.e., 80A, 80B) and respective light coupling regions 90 can be provided per assembly 20, where desired. In certain embodiments, an even number of light extracting regions (i.e., 80A, 80B) and respective light coupling regions 90 are provided per waveguide optic 70 for outputting a symmetric light distribution.

Each light coupling region 90 comprises a non-linear entrance geometry. The non-linear entrance geometry is comprised or formed from a plurality of non-linear light input surfaces 92. The non-linear light input surfaces 92 define a plurality of coupling cavities or features extending into the waveguide body 72 from a coupling face (F, FIG. 2C). Portions of the non-linear light input surfaces 92 are parabolic or wedge-shaped and form the parabolic or wedge-shaped entrance geometry. The parabolic or wedge-shaped light input surfaces 92 are symmetric about an axis of symmetry that is centrally disposed between immediately adjacent surfaces. When assembled in a waveguide fixture, a plurality of light emitters, including but not limited to LEDs are positioned towards and face the entrance geometry and input face. The entrance geometry and surfaces 92 thereof separates the LED light in two directions evenly as it enters the waveguide optic 70. The separated light rays are collimated in each direction upon entering the waveguide optic 70.

Figure 2B:
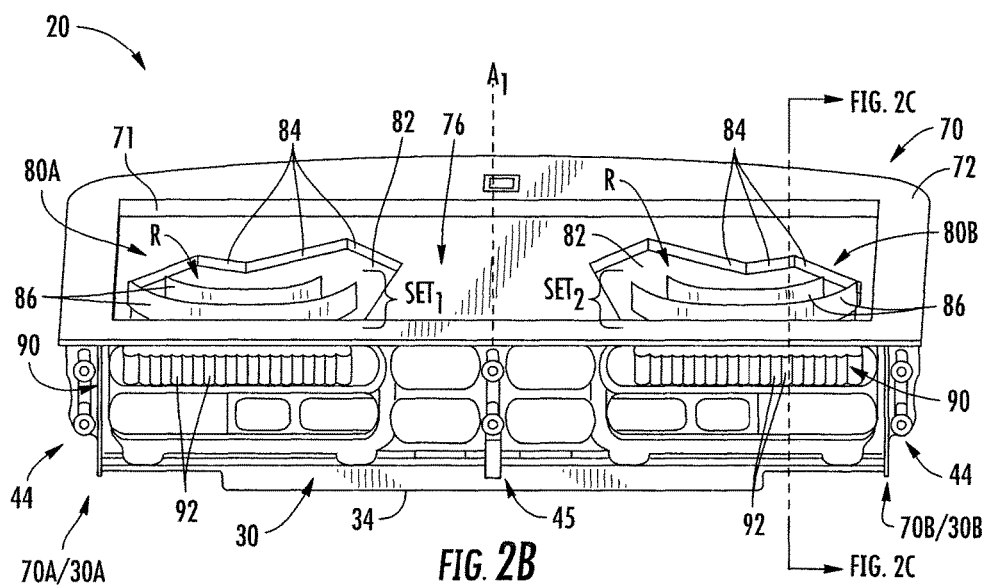

Referring now to FIG. 2B, it can be seen that the first and second light extracting regions 80A and 80B of the waveguide optic 70 each comprise a respective set of light extraction elements 86 located in a respective recessed portion or region R of the light extraction face 76. For example, the first light extracting region 80A comprises a first set $Set_1$ of extraction elements 86 and the second light extracting region 80B comprises a second set $Set_2$ of extraction elements 86. Each recessed region R of the extraction face 76 comprises a plurality of bridges 84 disposed at last partially around the extraction elements 86. The bridges 84 can connect and support the waveguide optic securely to the flange.

As FIG. 2B further illustrates, the first set $Set_1$ of light extraction elements 86 is disposed on a first side of an axis of symmetry $A_1$ and the second set $Set_2$ of light extraction elements 86 is disposed on a second side of the axis of symmetry $A_1$. Such arrangement of extraction elements 86 advantageously facilitates extraction of symmetric distributions of light in high vertical angles (i.e., greater than 60 degrees) for a wide distribution. Extraction elements 86 and bridges 84 disposed in the first light extracting region 80A are a mirror image of the extraction elements 86 and bridges 84 in the second light extracting region 80B. Alternatively, the extraction elements 86 and bridges 84 in the first light extracting region 80A are asymmetric relative to the light extraction elements 86 in the second light extracting region 80B.

The light extraction elements 86 can comprise a plurality of non-linear extraction elements, a plurality of linear extraction elements, or combinations of linear and non-linear elements. Exemplary embodiments of non-linear extraction elements include elements that are curved, rounded, elliptical, semi-elliptical, semi-circular, helical, arcuate, or disposed in non-linear shapes or patterns as viewed in the plane of the extraction face 76. Linear elements 86 may be arranged to form an open or closed regular shape (e.g., a triangle, a square, etc.) or an open or closed irregular shape as viewed in the plane of the extraction face 76. The faces (e.g., 86A, 86B in FIG. 2C) of the linear and non-linear elements 86 may be tapered, curved, faceted, or non-faceted for improved light extraction. Further, the faces (e.g., 86A, 86B in FIG. 2C) of the linear and non-linear elements 86 are either substantially orthogonal to the recessed floor 82 or angled thereto. The faces (e.g., 86A, 86B in FIG. 2C) can also have a sweep feature with a profile of at least one curved surface.

Figure 2C:
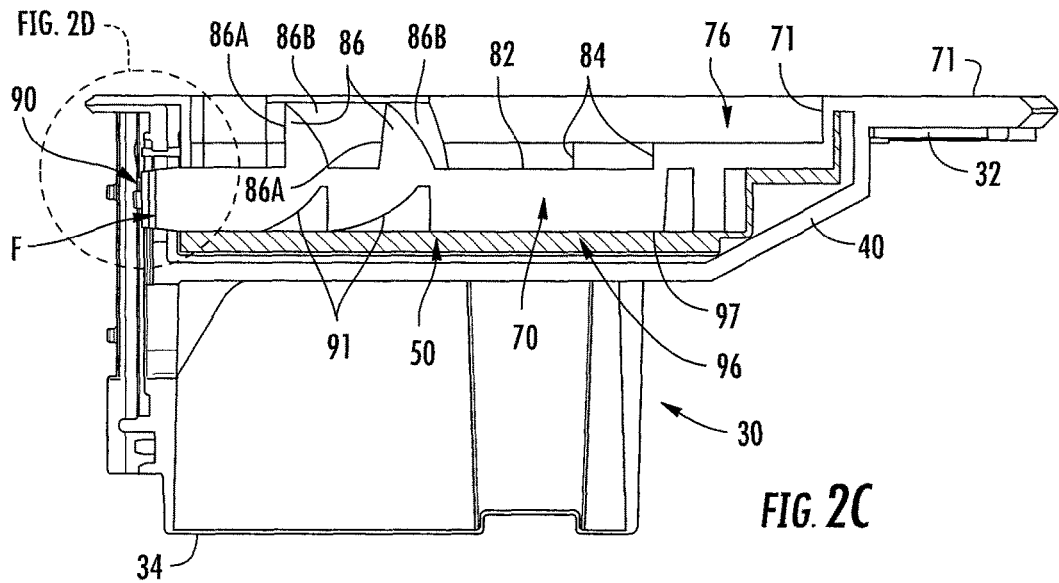

FIG. 2C is a sectional view of an assembled optic assembly 20 along the section indicated in FIG. 2B. When assembled, the optical insert 50 is disposed between and contacts portions of the optical housing 30 and the waveguide optic 70. The waveguide optic 70 comprises the light extraction face 76 and the light redirecting face 96. A light coupling face F (i.e., where the LED light sources face and couple to the optic) is substantially orthogonal to both the light extraction face 76 and the light redirecting face 96. The light redirecting face 96 contacts portions of the optical insert 50 and redirects stray or escaping light back the waveguide optic 70 and/or portions thereof (i.e., to the light coupling region 90 or extraction face 76). The redirecting face 96 can work in conjunction with the optical insert 50 and/or housing 30 to redirect light to the extraction face 76 of the waveguide optic 70.

As FIG. 2C further illustrates, each light extraction element 86 comprises a first light extraction face 86A and a second, opposing face 86B. The light extraction faces 86A of optic 70 are arranged substantially orthogonal with respect to the recessed floor 82 and facilitate backward light extraction. The light extraction faces 86A are TIR surfaces that facilitate light extraction primarily via TIR. The second, opposing faces 86B of light extraction elements 86 are substantially curved or rounded and angled with respect to the recessed floor 82. The second, opposing faces 86B of the light extraction elements 86 may also reflect light.

The light redirecting face 96 of the waveguide optic 70 comprises a plurality of light redirection elements 91 disposed thereon. The light redirection elements 91 can be specularly reflective, diffusively reflective, or partially specularly reflective and partially diffusively reflective. The light redirection elements 91 work in conjunction with the optical insert 50, housing 30, and/or surfaces or portions thereof to redirect light to the light extraction surface 76 where it can be extracted at wide angles for forming a desired, symmetric distribution of light. Various sections of the light redirecting face 96 can be specularly reflective while other sections exhibit diffuse reflectance. The number and arrangement of light redirecting elements 91 can be selected to match and/or correspond to extraction elements 86 according to several considerations including, but not limited to the desired size, shape, and/or type (i.e., Type II, Type III, Type IV, Type V, etc.) of lighting distribution.

In some embodiments, the optical insert 50 fully encloses the sidewalls and base of the waveguide optic 70. In alternative embodiments, the optical insert 50 does not fully enclose the sidewalls and/or base of the waveguide optic 70. The optical insert 50 can be selectively positioned in the compartment 35 of the optic housing 30 so that the reflective sidewalls 38 and/or base wall 40 of the optic housing 30 also work in conjunction with the optical insert 50 and light redirecting face 96 to provide desired lighting distributions from the optic assembly 20.

Figure 2D:
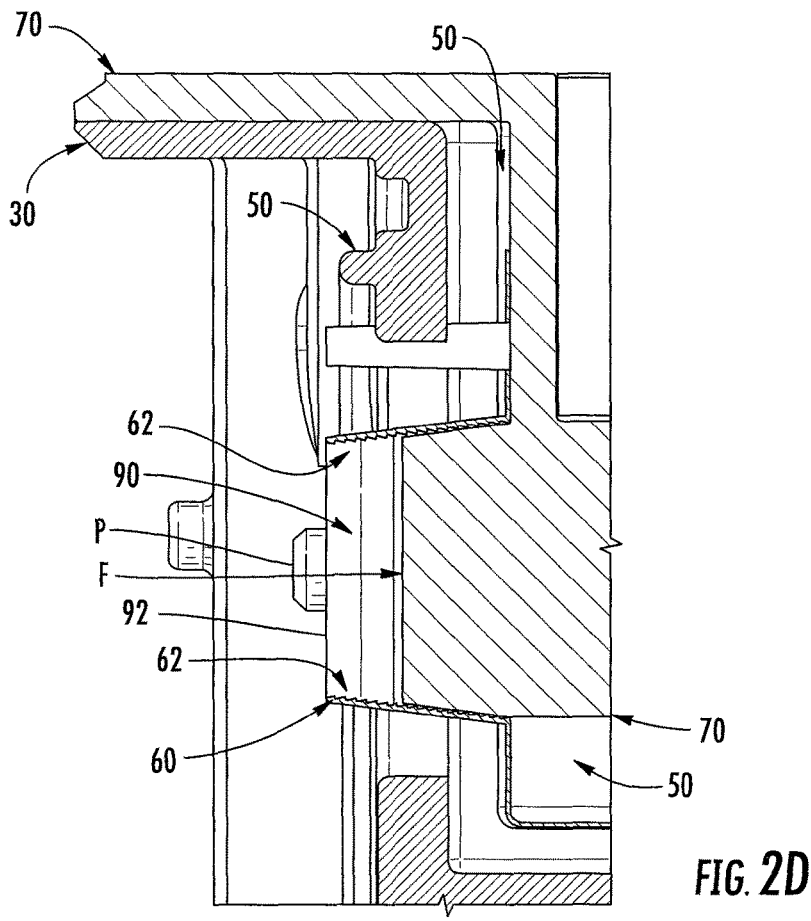

FIG. 2D is a detailed view of the light coupling region as indicated in FIG. 2C. As FIG. 2D illustrates, one or more optional reflective sleeves 60 can be provided. Where provided, the sleeves 60 can cover and match the external geometry of the light coupling region 90 of the waveguide optic 70 according to some embodiments. The waveguide optic 70 can taper in the light coupling region 90 towards the light coupling face F that faces the LEDs. The reflective sleeves 60 match the taper angle of the waveguide optic 70, thereby providing an aperture entrance geometry that matches the geometry of the waveguide optic 70 in the light coupling region 90.

The reflective sleeves 60 can optionally comprise a textured surface, for example, comprised of facets 62 for returning light to the waveguide optic 70 that has escaped the light coupling region 90. Light rays failing to meet TIR in the coupling region 90 can leak out of the waveguide optic 70. The reflective sleeves 60 can assist in redirecting any escaping light rays back into to the coupling region 90 for redistribution in the waveguide optic 70 leading to optical efficiency enhancements. In the embodiment of FIG. 2D, the waveguide optic 70 further comprises an alignment pin P for aligning an LED array board to the light coupling region 90. FIGS. 2A-2D are provided for illustration purposes only. Numerous modifications and adaptations will be readily apparent to those of skill in the art without departing from the instant subject matter.

Figure 2E:
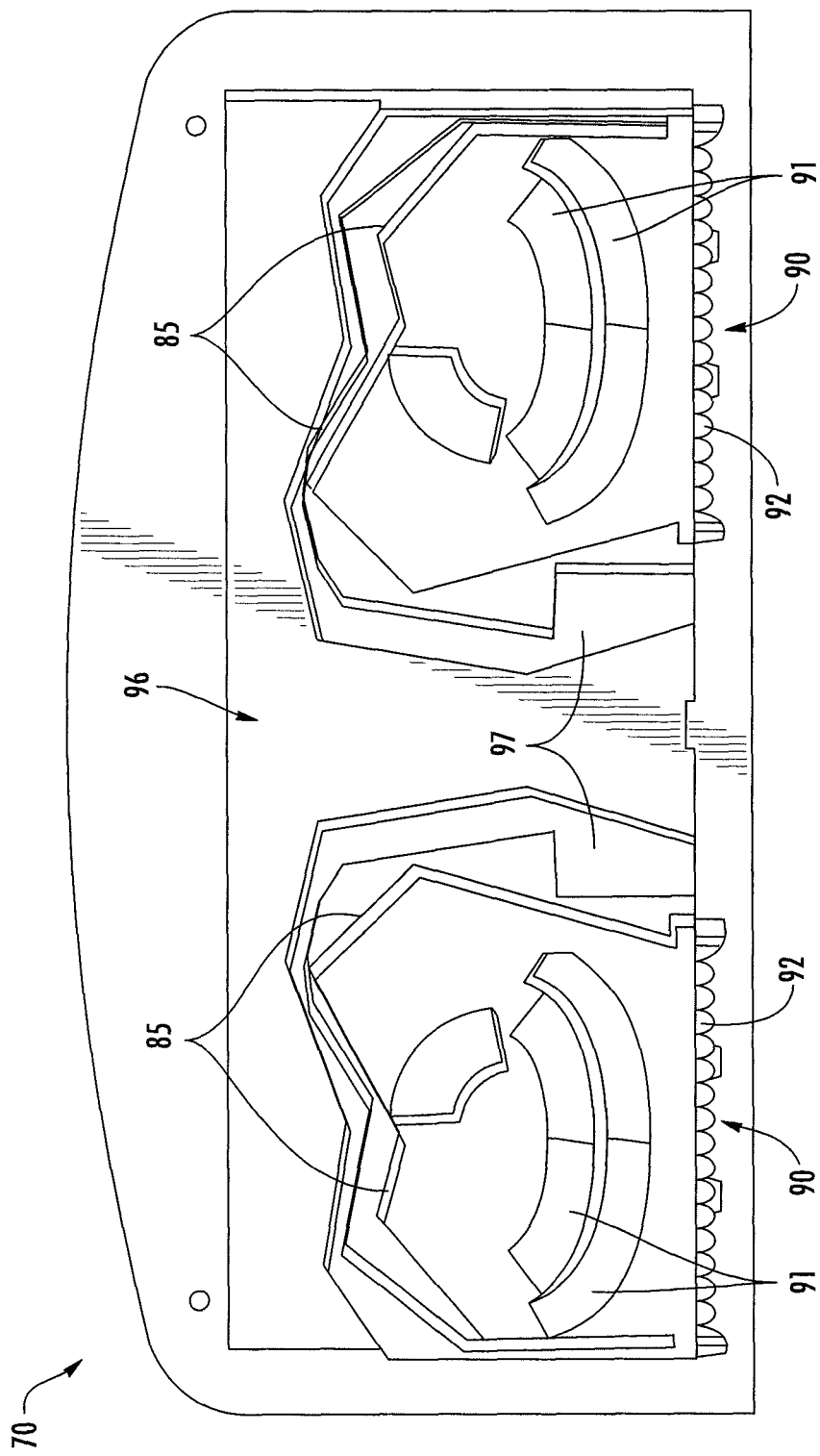

FIGS. 2E-2F illustrate various features disposed on or over a rear (bottom) face or side of the waveguide optic 70, which is on an opposing side or underlying surface of the light extraction face 76. For example, FIGS. 2E-2F illustrate various aspects associated with the light redirecting face 96 of optic 70. FIGS. 2E and 2F differ in that FIG. 2E includes an optional light recycling feature 97, whereas FIG. 2F does not.

Referring now to FIGS. 2E-2F, and in general, a plurality of light redirecting facets 85 (also referred to as "light deflection surfaces"), are disposed around portions of the light redirection elements 91. Facets 85 are configured to redirect light to light extraction elements 86 and facilitate light extraction by virtue of meeting the TIR requirements. Alternatively, the facets 85 may be specularly reflective and redirect light to light extraction elements 86 for facilitating light extraction. For example, light deflected (i.e., via either meeting the TIR requirements or specular reflection) by facets 85 is then redirected to and extracted by the extraction elements 86. In some embodiments, the facets 85 are provided with a specularly reflective coating. In other embodiments, the facets 85 reflect light via TIR surfaces and are devoid of a specularly reflective coating.

The facets 85 are configured to redirect light through the optic 70 and/or out of the optic via the extraction face 76. The facets 85 are configured to direct light through and/or out of the waveguide optic 70 and towards the light extraction elements 86. The extracted light forms a substantially symmetric lighting distribution over a plane or surface opposite the light extraction face 76 and/or a front or top plane of the optic 70. Adjacent facets 85 can be disposed at acute, obtuse, or right angles for providing a desired light output. Further, each facet 85 can form a surface or wall that is substantially orthogonal to the recessed floor 82 of each respective recessed region R (FIG. 2B).

Referring to FIG. 2E, an optional recycling feature 97 can be disposed on or over the redirecting face 96 of optic 70 in some embodiments. The recycling feature 97 can be formed in the redirection face 96 via molding, extruding, printing, or any other suitable method not inconsistent with the invention, and comprises the same, transparent material as the remaining optic 70. The recycling feature 97, where used, is disposed around a perimeter of and/or encompasses the facets 85 for redirecting light back into the optic via TIR surfaces. For example, stray or leaking light rays are guided to extraction elements 86 via the recycling features 97. Referring now to FIG. 2F, and in some embodiments, the optic 70 is devoid of a recycling feature 97. Rather, the plurality of facets 85 redirect light through the optic 70 via TIR surfaces. The facets 85 direct light towards the light extraction elements 86 for backwards extraction in a preferential direction as shown and described, for example, in FIG. 1C.

FIGS. 3A-3C illustrate perspective top, top plan, and side views of the optical insert 50. Referring to FIGS. 3A-3C and as noted above, the optical insert 50 comprises a reflective compartment 52 defined by a plurality of reflective sidewalls 53A and a reflective base 53B. The compartment 52 is defined between a top surface 54 and a bottom surface 55 and between a front face 58 and a rear face 59. The compartment 52 may fully or partially cover waveguide optic 70, where desired.

In some embodiments, multiple terraces 57 form a continuous border that encloses sidewalls of the waveguide optic 70. The base wall 53B is substantially flat or planar for receiving the base of the waveguide optic 70. The sidewall apertures 56 permit interfacing between LEDs (i.e., the light source) and the light coupling region 90 of the waveguide optic 70. The sidewall apertures 56 can also retain the sleeves 60 against portions of the light coupling region 90.

As illustrated in FIG. 3B, the reflective sidewalls 53A include both straight and curved portions for forming a continuous border that covers and/or encloses sidewalls of the waveguide optic 70. The reflective sidewalls 53A are normal or substantially normal to the base wall 53B. The one or more reflective sidewalls 53A form an angle with the reflective base wall 53B that is between 85-95 degrees. Normal orientation of the reflective sidewalls 53A relative to the reflective base wall 53B of the optical insert 50 can redirect light escaping the waveguide optic 70 to pass through the extraction face 76 at angles greater than 60 degrees relative to an axis normal to the extraction face. This wide angle distribution of light can enable the optic assembly to meet the requirements of Type V and/or Type II lighting distributions.

FIG. 3D is a perspective view of a reflective sleeve 60. Two or more reflective sleeves 60 may be provided per optic assembly 20. Reflective sleeves 60 can be positioned adjacent to the sidewall aperture 56 of the insert 50, and cover portions of the light coupling region 90 of the waveguide optic 70. The reflective sleeves 60 can be separate, discrete pieces or bodies of material. However, the reflective sleeves 60 may also be integrally formed with any of the insert 50, housing 30, and/or waveguide optic 70.

The reflective sleeves 60 can be provided as a separate piece of material for coupling with the optical insert 50 and waveguide optic 70 according to some embodiments. The reflective sleeves 60 comprise a reflective body 64 having a first surface 61 configured to face the optical insert 50 and a second surface 63 configured to face the waveguide optic 70. The reflective sleeves 60 have dimensions sized to cover the light coupling region 90 of the waveguide optic. In some embodiments, for example, the waveguide optic 70 tapers to match the tapering of the light coupling region 90. Portions of the reflective sleeves 60 can be angled (i.e., at angles α and/or β) to match the tapered angle and/or geometry of the light coupling region 90. Accordingly, angles α and β can be varied independent of one another in response to geometrical considerations of the light coupling region 90.

The sleeves 60 include one or more bendable or movable members 64A that are positionable at the various angles α,β relative to the remaining body 64. In some embodiments, the angles α and β are the same value. For example and in some embodiments, angles α and β are each less than about 90 degrees. In other embodiments, the angles α and β are different values. FIGS. 3A-3D are provided for illustration purposes only. Numerous modifications and adaptations will be readily apparent to those of skill in the art without departing from the instant subject matter.

Figure 4:
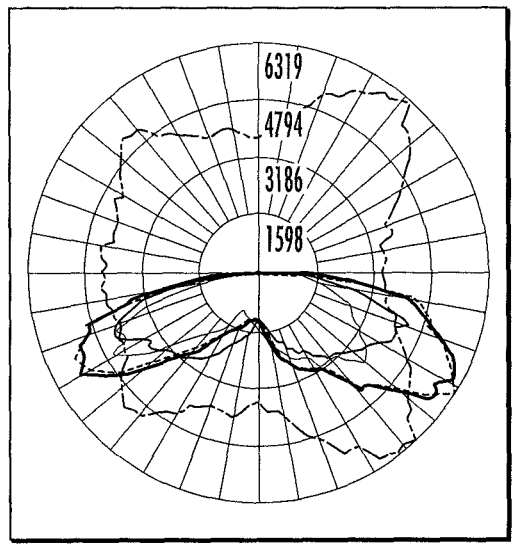
FIGS. 4-5 illustrate lighting distributions of the optic assembly of FIG. 2 according to some embodiments.
Figure 5:
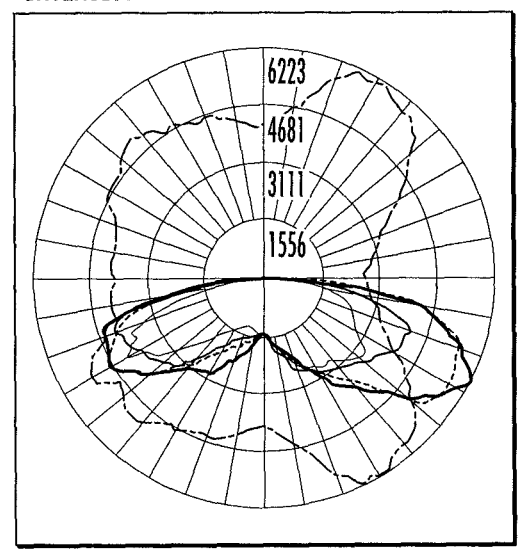

FIGS. 4-5 illustrate aspects associated with to lighting distribution provided by optic assemblies described herein, including optic assembly 20. As FIGS. 4 and 5 illustrate, the waveguide optic in conjunction with the optical insert provide a Type V distribution with peak lighting intensity greater than 60 degrees.

FIGS. 6A-8D illustrate different waveguide optics for use in lighting devices and/or fixtures according to some embodiments. The basic features, architectures, and/or operational principles of the various waveguide optics in FIGS. 6A-8D are similar; however, each waveguide optic utilizes different arrangements of light extraction elements and light redirection elements for providing different lighting distributions. Notably, the lighting distributions extracted by each waveguide optic are symmetric about at least one line of symmetry with a high output flux of at least 24,000 lumens or more. The distribution may include any of a Type II, Type III, Type VI, or Type V lighting distribution. Any other type of lighting distribution may also be extracted by the optics set forth in FIGS. 6A-8D consistent with the instant disclosure.

Figure 6A:
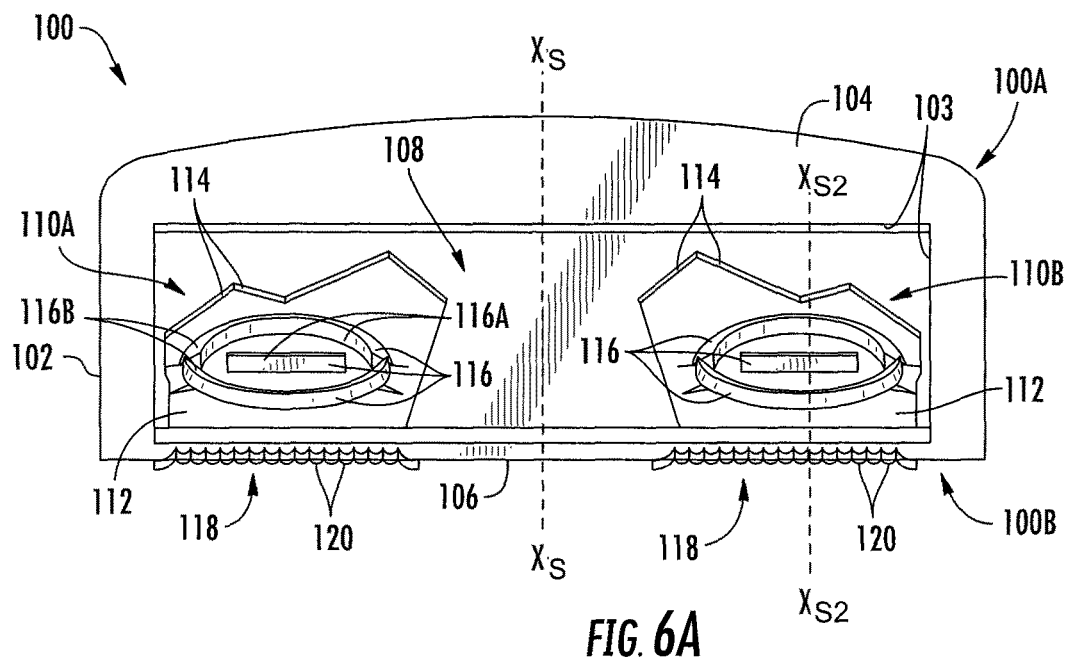
FIGS. 6A-8F illustrate various waveguide optics of an optic assembly of a lighting device according to some embodiments.
Figure 6B:
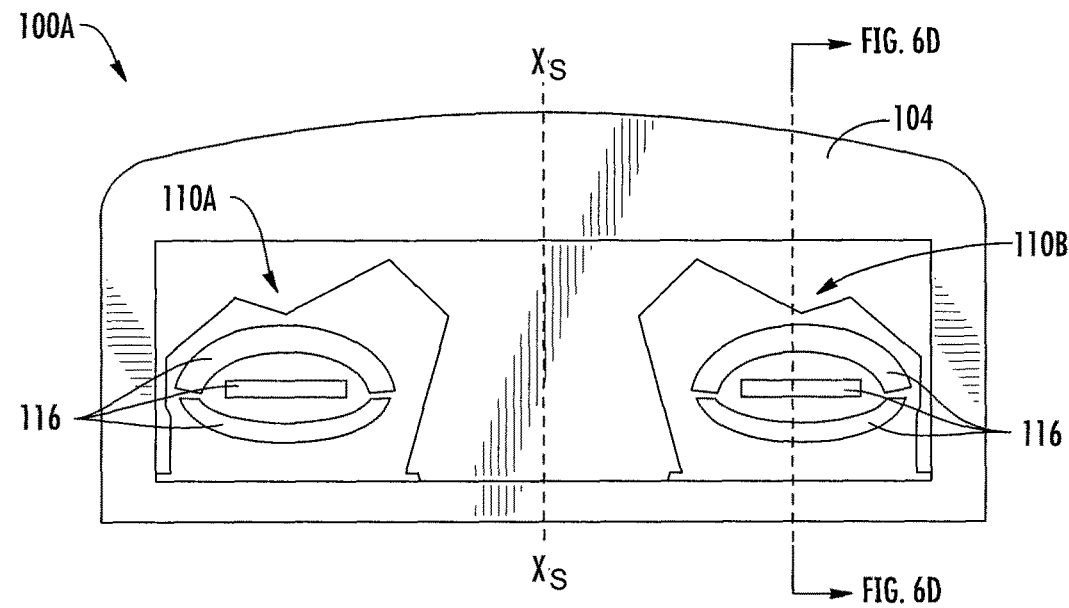
Figure 6C:
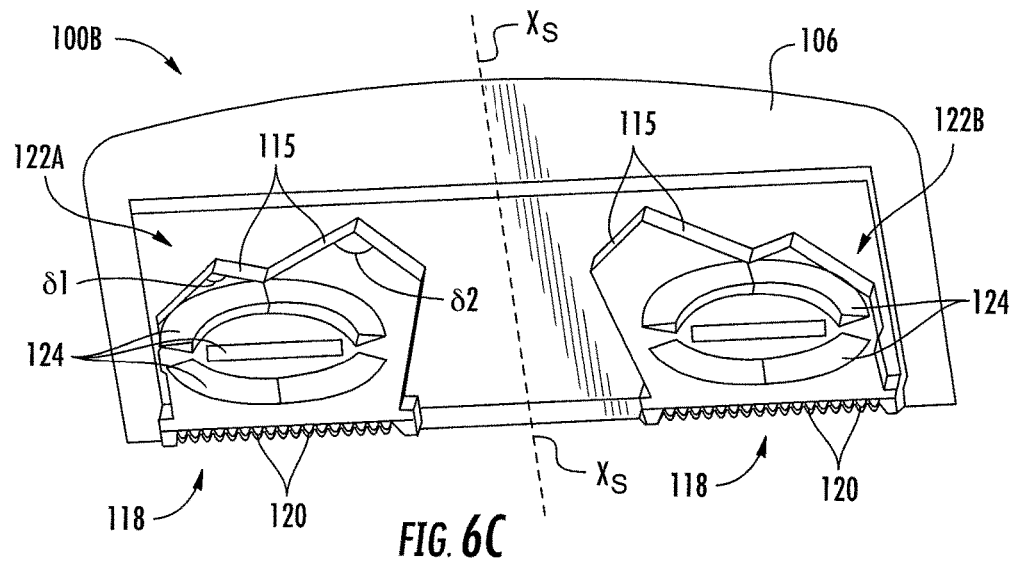
Figure 6D:
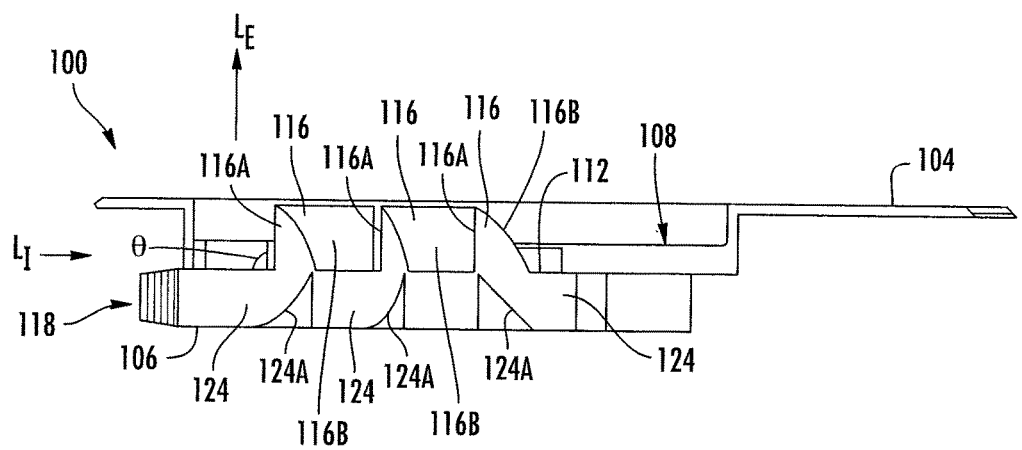

FIGS. 6A-6D illustrate a waveguide optic, generally designated 100, for an optic assembly (e.g., 20, FIG. 2) of a lighting device. FIG. 6A is a perspective view of the waveguide optic 100, FIG. 6B is a plan view of a top or front side 100A of the waveguide optic 100, FIG. 6C is a plan view of the bottom or rear side 100B of waveguide optic 100, and FIG. 6D is a sectional view of the waveguide optic 100 taken along the lines indicated in FIG. 6B.

Referring generally to FIGS. 6A-6D, the waveguide optic 100 includes a waveguide body 102 comprising a front or top surface 104 on the front side 100A of the body and a rear or bottom surface 106 on the rear side 100B of the body. The top and bottom surfaces 104, 106 are disposed on opposite sides of the body 102. The front side 100A of the optic is configured to extract a specific distribution of light from a plurality of LEDs via a light extraction face 108. The bottom surface 100B of the optic is configured to work in conjunction with the optical insert and/or housing of the optic assembly (e.g., 20, FIG. 2A) and redirect light through and/or to the light extraction face 108. The extraction face 108 is disposed between a plurality of sidewalls 103. The sidewalls 103 and front faces 116A of extraction elements comprise TIR surfaces that facilitate light extraction primarily via TIR. Light can be redirected (e.g., via deflection/reflection) to extraction elements 116 via facets (i.e., 115, FIG. 6C) and/or redirection elements (i.e., 124, FIG. 6C) disposed on an opposing face.

As FIGS. 6A and 6B illustrate, the front side 100A comprises a first light extracting region 110A and a second light extraction region 110B. Each light extracting region 110A and 110B includes a recessed portion terminating a recess floor 112. A plurality of light extraction elements 116 are disposed over the recess floor 112. In this embodiment, the plurality of light extraction elements include at least one linear (non-curved) extraction element centrally disposed between a plurality of non-linear (curved) extraction elements. The curved extraction elements 116 are arranged in a semi-circular or semi-elliptical arrangement around the linear element. A plurality of bridges 114 are disposed around portions of the recess floor 112 and surround portions of the light extraction elements 116. Front, light extraction faces 116A of the light extraction elements 116 are refractive surfaces that extract light backwards (i.e., towards the light coupling regions 118). The light extraction elements 116 can extract light received directly from the LED light sources or indirectly from the facets 115 (FIG. 6C) and/or light redirection elements 124 (FIG. 6C).

As FIG. 6A further illustrates, within each set of light extraction elements 116 in a given light extracting region 110A and/or 110B, the plurality of light extraction elements 116 are asymmetric about a line of symmetry $X_2$. The light extraction elements 116 in each light extraction region do not have a mirror image on either side of the line of symmetry $X_2$, and can be devoid of a line of symmetry. The light extracting regions 110A and 110B are configured to extract a symmetric distribution of light from a plurality of light emitters, such as LEDs, that are facing and coupled to one or more light coupling regions 118. As FIG. 6B illustrates, the light extracting regions 110A and 110B are symmetric with respect to each other about an axis of symmetry $X_S$ that bisects the top surface 104.

Referring to FIG. 6C and in some embodiments, the rear side 100B of optic 100 comprises a plurality of facets 115 and/or light redirection elements 124 formed therein. The plurality of facets 115 and/or portions thereof are fully or partially specularly reflective for redirecting light towards light extraction elements 116. The light extraction elements 116 can then extract light backward via refractive surfaces (i.e., 116A). Alternatively, facets 115 comprise TIR surfaces that redirect light back towards the light extraction elements 116.

Adjacent facets 115 are provided at various angles δ1 and δ2 with respect to each other. The angles δ1 and δ2 may have substantially the same value or different values, where desired, for providing a desired lighting distribution and/or output. Notably, the light redirecting regions comprised of facets and/or redirection elements 124 are symmetric about at least a first axis of symmetry $X_S$, and in some instances, about two or more axes of symmetry.

Further with respect to FIGS. 6A-6D in general, it is seen that each light coupling region 118 comprises a non-linear entrance geometry. The entrance geometry is formed from a plurality of non-linear light input surfaces 120. The non-linear light input surfaces 120 define light coupling cavities or features that extend into the waveguide body 102 from a coupling face F (see FIG. 2C). Portions of the non-linear light input surfaces 120 are parabolic or wedge-shaped and form a parabolic or wedge-shaped entrance geometry. The parabolic or wedge-shaped light input surfaces 120 are symmetric about an axis of symmetry that is centrally disposed between immediately adjacent surfaces. Portions of the parabolic or wedge-shaped entrance geometry are configured to split or separate the light from the LEDs coupled thereto into two directions. The light is then collimated on a horizontal plane and symmetrically extracted on a vertical plane at wide angles via light extraction face 108.

FIG. 6C illustrates the rear side 100B of the optic in more detail. The rear side 100B faces and/or engages portions of an optical insert (i.e., 50, FIG. 3A). The bottom surface 106 is a light redirecting face configured to redirect light from the rear side 100B to the front side 100A. A plurality of light redirection elements 124 are disposed over the light redirecting face. The plurality of light redirection elements 124 are disposed in a first light redirecting region 122A and a second light redirection region 122B opposite the first and second light extracting regions 110A and 110B. The light redirection elements 124 in each region 122A and 122B can be a combination of linear and non-linear elements. A plurality of facets 115 are disposed around the light redirection elements 124, and redirect light to the front side 100A via TIR surfaces. The facets 115 can be symmetric about a line of symmetry or asymmetric and devoid of a line of symmetry. In some embodiments, the light redirection elements 124 have a sweep feature with a profile of at least one curved surface. Further, the light extraction and redirection elements can have a pair relation for light cascading prior to extraction toward entrance geometry.

FIG. 6D is a sectional view of waveguide optic 100. As FIG. 6D illustrates, each light extraction element 116 includes a front, light extraction face 116A and a rear face 116B. The front faces 116A facilitate backward light extraction via TIR. The front faces can be substantially orthogonal with respect to the recess floor 112 at an angle θ, which is approximately 90 degrees. The rear faces 116B can curve, taper, or angle vertically away from the recess floor 112. Each light redirection element 124 includes a light redirecting face 124A that tapers or curves towards the light extraction face 108.

Input light (i.e., ingress light) $L_I$ will enter the optic 100 proximate the light coupling region 118 and is extracted in a direction that is substantially orthogonal to and/or aimed backwards (i.e., back towards the direction of input light $L_1$). For example, extracted light $L_E$ is in a direction that is substantially perpendicular to the plane of the light extraction face 108 and focused in a preferential direction that is at least partially backwards, towards the point of entry. The input light $L_I$ is reflected in slow angles near the entrance geometry and extracted in high vertical angles over 60 degrees for a wide distribution.

Figure 7A:
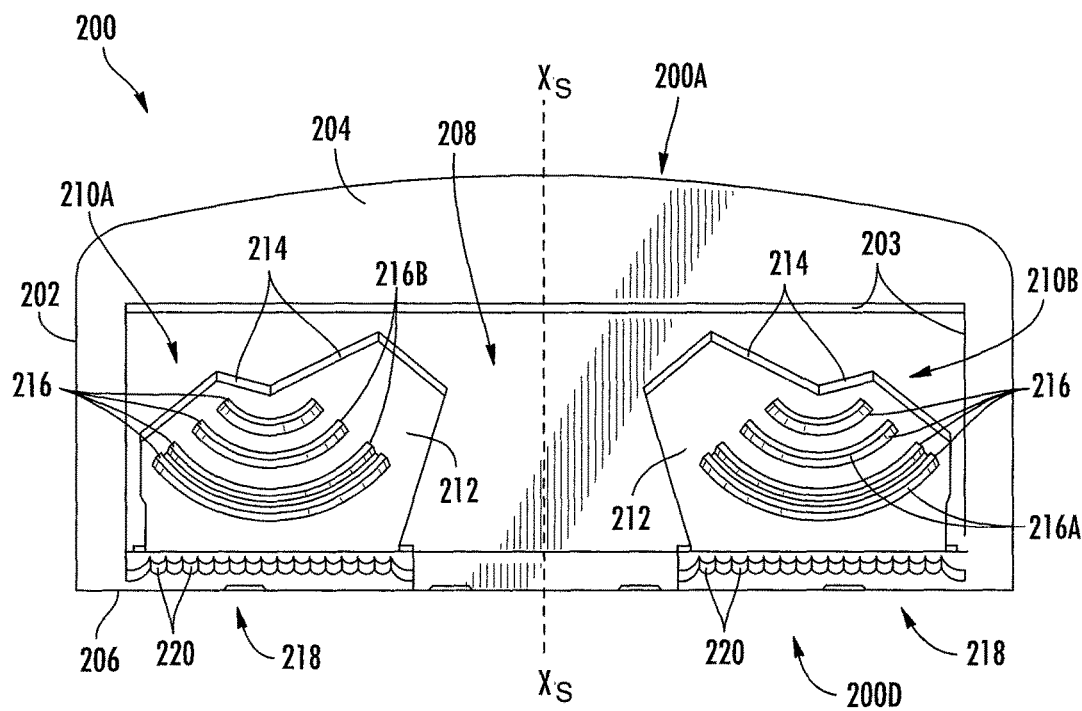
Figure 7B:
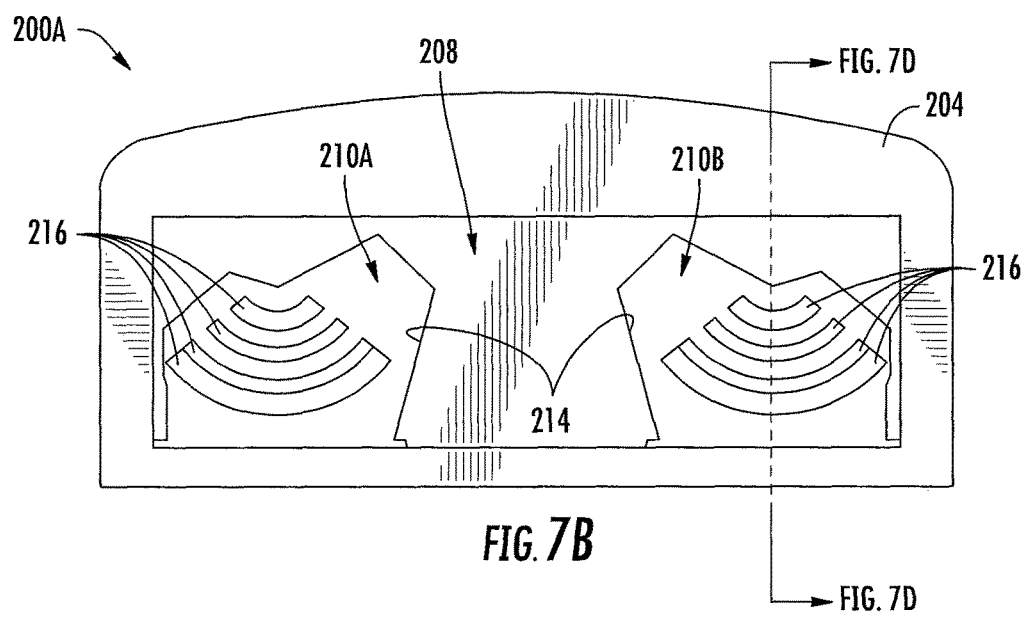
Figure 7C:
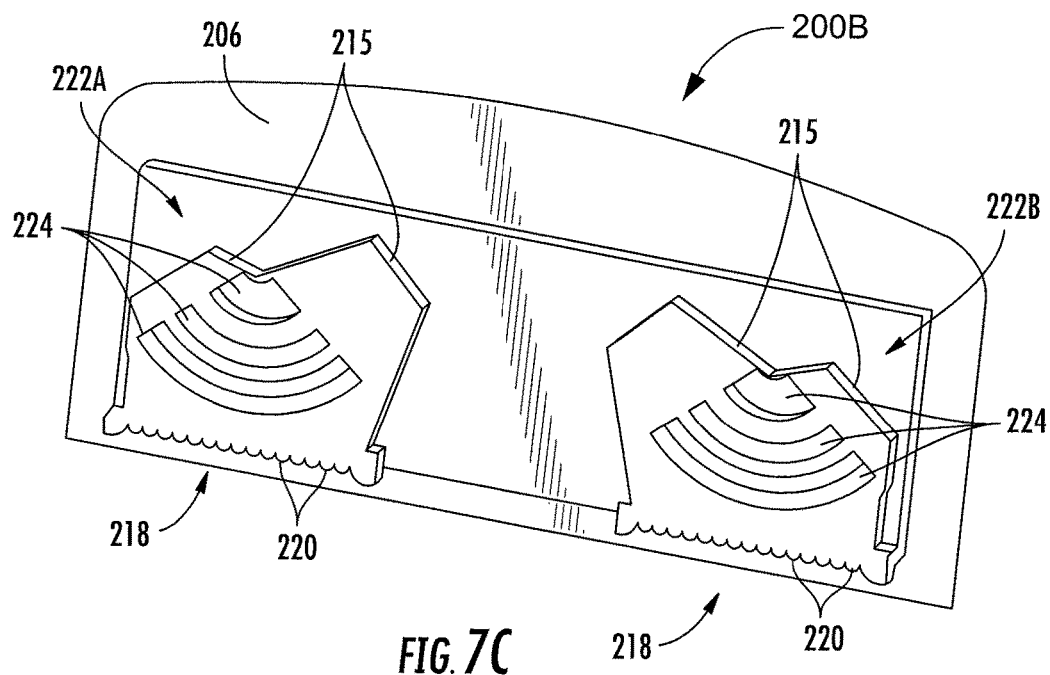
Figure 7D:
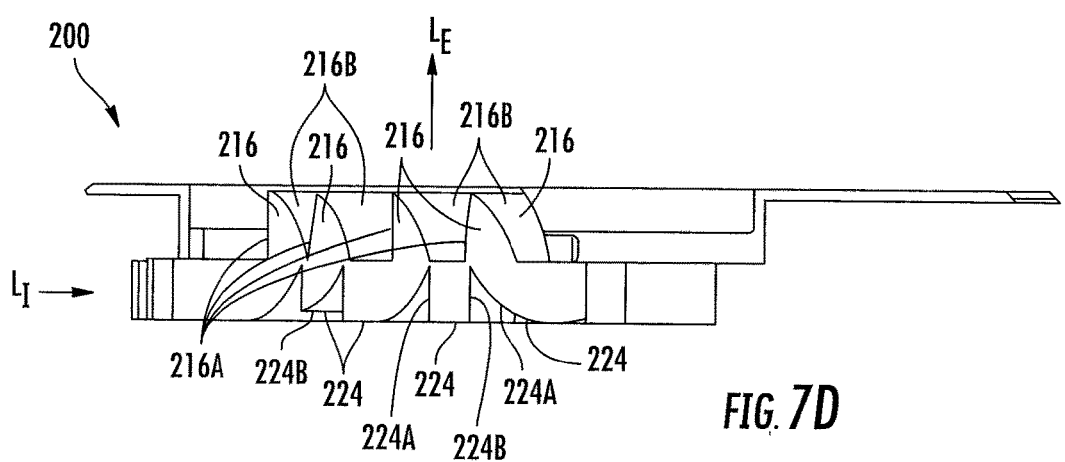

FIGS. 7A-7D illustrate a waveguide optic 200, which is similar in form, function, and operation to previously described optics. Waveguide optic 200 includes a plurality of curved light extraction elements and is devoid of linear light extraction elements. FIG. 7A is a perspective view of the waveguide optic 200, FIG. 7B is a plan view of a top or front side 200A of the waveguide optic 200, FIG. 7C is a plan view of the bottom or rear side 200B of waveguide optic 200, and FIG. 7D is a sectional view of the waveguide optic 200 taken along the lines indicated in FIG. 7B.

Briefly, the waveguide optic 200 includes a waveguide body 202 comprising a top surface 204 on the front side 200A of the body and a bottom surface 206 on the rear side 200B of the body. The front side 200A of the optic extracts a specific distribution of light from a plurality of LEDs via a light extraction face 208. The bottom side 200B of the optic is configured to work in conjunction with the optical insert and/or housing of the optic assembly (e.g., 20, FIG. 2A) and redirect light through and/or to the light extraction face 208. The extraction face 208 is disposed between a plurality of reflective sidewalls 203 that facilitate light extraction and/or redirection of light to one or more light extraction elements.

A plurality of light extracting regions 210A, 210B are provided on or over the light extraction face 208. Each light extracting region 210A and 210B includes a recessed portion that terminates at a recess floor 212. A plurality of light extraction elements 216 are disposed over the recess floor 212. In this embodiment, the plurality of light extraction elements 216 include a plurality of parallel curvatures that define a quarter-circular surface area. The extraction elements 216 include at least one line of symmetry and are concentric. Alternatively, the extraction elements can be asymmetric. The elements 216 extract light via vertically disposed front, light extraction faces 216A. The front faces 216A extract light backwards (i.e., towards the light coupling regions 218) via refractive surfaces. The elements 216 include rear faces 216B that are refractive. A plurality of bridges 214 are disposed around the extraction elements 216. The two light extracting regions 210A and 210B are symmetric about at least a first axis of symmetry $X_S$, and in some instances, about two or more axes of symmetry. Alternatively, the two light extracting regions 210A and 210B are symmetric. In certain embodiments, the light extracting regions 210A and 210B are configured to extract a symmetric distribution of light from a plurality of light emitters, including but not limited to LEDs, that are facing and coupled to one or more light coupling regions 218. The axis of symmetry $X_S$ bisects the top surface 204 as indicated in FIG. 7B.

FIG. 7C illustrates a rear side 200B of optic 200, which comprises a plurality of facets 215 and/or light redirection elements 224 formed therein. In some embodiments, each facet 215 and/or portions thereof are fully or partially specularly reflective for redirecting light towards light extraction elements 216. The light extraction elements 216 can then extract light backward via refractive surfaces (i.e., 216A). Alternatively, facets 215 may comprise TIR surfaces that redirect light back towards the light extraction elements 216 for facilitating light extraction. The light extraction elements 216 can extract light received directly from the LED light sources or indirectly from the facets 215 and/or light redirection elements.

Each light coupling region 218 comprises a non-linear entrance geometry formed from a plurality of non-linear light input surfaces 220. The non-linear light input surfaces 220 extend into the waveguide body 202. Portions of the non-linear light input surfaces 220 are parabolic or wedge-shaped and form a parabolic or wedge-shaped entrance geometry. The parabolic or wedge-shaped entrance geometry are configured to separate the light so that the light can be symmetrically extracted wide angles via light extraction face 208.

The rear side 200B is configured to face and/or engage portions of an optical insert (i.e., 50, FIG. 3A). The bottom surface 206 of optic 200 is a light redirecting face configured to redirect light from the rear side 200B to the front side 200A. A plurality of light redirection elements 224 are disposed over the light redirecting face, below portions of the extraction elements. The plurality of light redirection elements 224 are configured in a set over a first light redirecting region 222A and a second light redirection region 222B. The first and second light redirection regions 222A and 222B are opposite the first and second light extracting regions 210A and 210B. The light redirection elements 224 in each region 222A and 222B are curved and substantially parallel.

FIG. 7D is a sectional view of waveguide optic 200. Each light extraction element 216 includes the front, light extraction face 216A and the rear face 216B. The front faces 216A facilitate backward light extraction while the rear faces 216B curve, taper, or angle away from the recess floor 212. Each light redirection element 224 includes opposing light redirecting surfaces 224A and 224B that taper or curve towards the light extraction face 208.

Ingress light $L_1$ enters the optic 200 proximate the light coupling region 218 and is extracted in a direction that is substantially orthogonal and/or at least partially backwards with respect to $L_I$. The extracted light $L_E$ is output in a direction or plane that is substantially perpendicular to the plane of the light extraction face 208. The input light $L_I$ is reflected in slow angles near the entrance geometry and extracted in high vertical angles over 60 degrees for a wide distribution. For example, extracted light $L_E$ is in a direction that is substantially perpendicular to the plane of the light extraction face and focused in a preferential direction that is at least partially backwards, back towards the point of entry.

Of note, some of the input light LI may escape from the coupling zone and be reflected by reflective sleeves (FIG. 3D) in slow angles near the entrance geometry. The escaped light can be guided by the reflective sleeves (FIG. 3D), portions of which are angled relative to the horizontal plane as described above, and into the waveguide optic 300. Eventually, any escaped rays of light would be extracted in the preferential direction via the extraction elements and facets described herein.

Figure 8A:
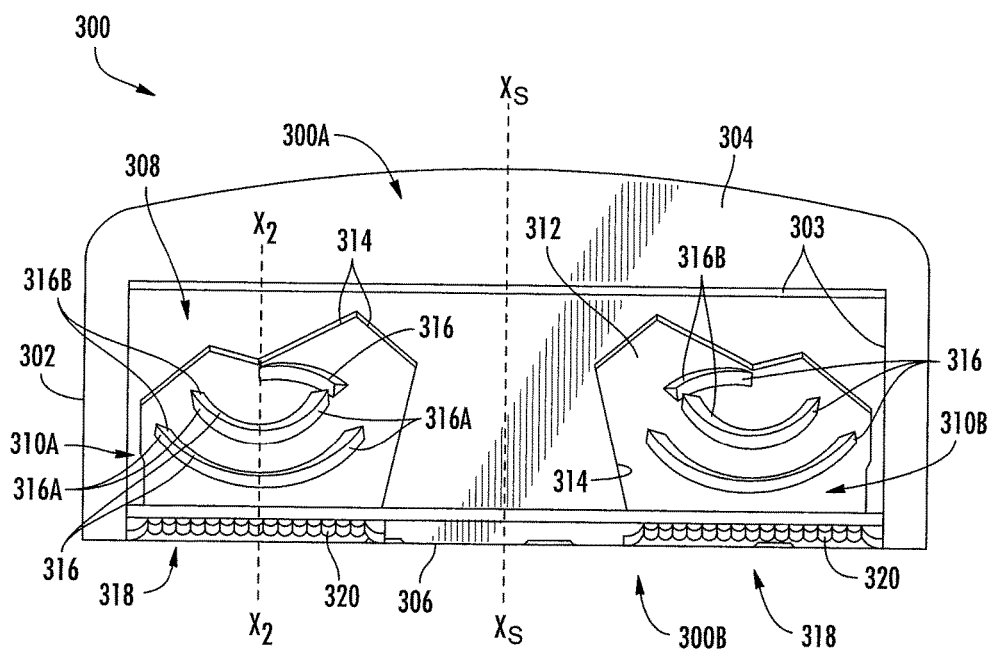
Figure 8B:
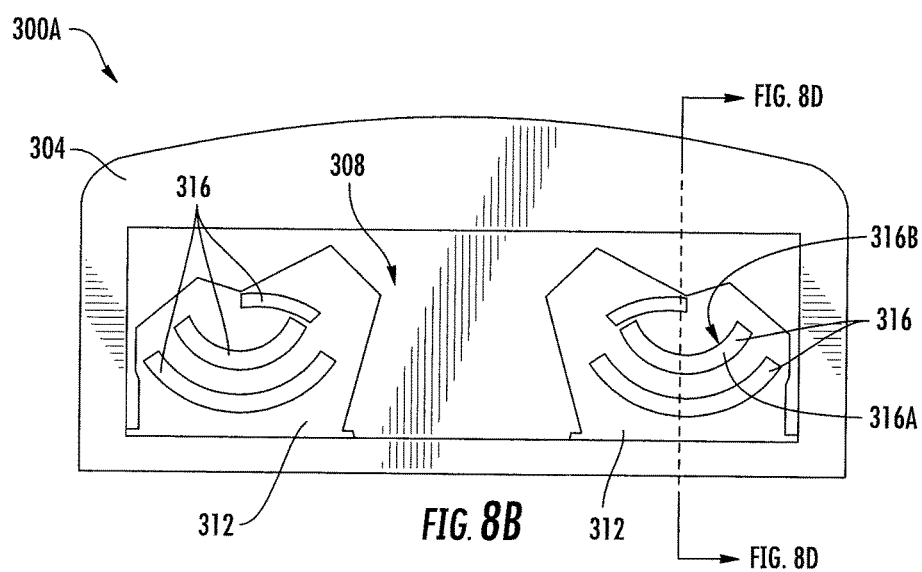

Another embodiment of a waveguide optic, generally designated 300 is illustrated in FIGS. 8A-8D. FIGS. 8E-8F are detail views of portions of the optic 300. Waveguide optic 300 is similar in form, function, and operation to previously described optics. Waveguide optic 300 includes a plurality of curved light extraction elements and is devoid of linear light extraction elements. FIG. 8A is a perspective view of the waveguide optic 300, FIG. 8B is a plan view of a top or front side 300A of the waveguide optic 300, FIG. 8C is a plan view of the bottom or rear side 300B of waveguide optic 300, and FIG. 8D is a sectional view of the waveguide optic 300 taken along the lines indicated in FIG. 8B.

Briefly, the waveguide optic 300 includes a waveguide body 302 comprising a top surface 304 on the front side 300A of the body and a bottom surface 306 on the rear side 300B of the body. The front side 300A of the optic extracts a desired distribution of light from a plurality of LEDs via a light extraction face 308. The bottom surface 300B of the optic is configured to redirect light through and/or to the light extraction face 308. The extraction face 308 is disposed between a plurality of reflective sidewalls 303 that also facilitate light extraction.

A plurality of light extracting regions 310A, 310B are provided over the light extraction face 308. Each light extracting region 310A and 310B includes a recessed portion terminating at a recess floor 312. A plurality of light extraction elements 316 are disposed over the recess floor 312. In this embodiment, the plurality of light extraction elements 316 include multiple curvatures that are substantially quarter-circular in shape. Two of the curved elements 316 are concentric and parallel to each other while at least one other curved element 316 is oppositely curved. Individual elements 316 in a given set of extraction elements are not symmetric with regards axis $X_{S2}$, however, the opposing sets of extraction elements are symmetric with regards to axis $X_S$. Alternatively, individual elements 316 in a given set of extraction elements and the opposing sets of extraction elements are asymmetric relative to each other over the extraction face 308.

The elements 316 extract light via vertically disposed front light extraction faces 316A. Such faces 316A can extract light backwards (i.e., back towards the light coupling regions 318) via refractive surfaces. The elements 316 include rear faces 316B that may be curved, tapered, or rounded. A plurality of bridges 314 are disposed around the extraction elements 316. The light extraction elements 316 can extract light received directly from the LED light sources or received indirectly from the facets (315, FIG. 8C) and/or light redirection elements (324, FIG. 8C).

The light extracting regions 310A and 310B are configured to extract a symmetric distribution of light from a plurality of light emitters, such as LEDs, that are facing the light extraction faces 316A and are coupled to one or more light coupling regions 318. Each light coupling region 318 comprises a non-linear entrance geometry formed from a plurality of non-linear light input surfaces 320.

FIG. 8C illustrates the rear side 300B of the optic in more detail. The optic 300 comprises a plurality of facets 315 and/or light redirection elements 324 formed on or over the rear side 300B thereof. The rear side 300B faces and/or engages portions of an optical insert (i.e., 50, FIG. 3A). The bottom surface 306 is a light redirecting face configured to redirect light from the rear side 300B to the front side 300A. The facets 315 comprise TIR surfaces that redirect light to the light extraction elements 316 for facilitating light extraction. The light extraction elements 316 can extract light received directly from the LED light sources or indirectly from the facets 315 and/or light redirection elements 324.

The plurality of light redirection elements 324 are disposed over the light redirecting face. The plurality of light redirection elements 324 are disposed in a first light redirecting region and a second light redirection region opposite the first and second light extracting regions 310A and 310B. The light redirection elements 324 in each are curved and non-linear. In some embodiments, one or more recycling features or members 317 are disposed around and encircle or enclose portions of the redirecting elements 324 and/or facets 315. The recycling members 317 are optional, and facilitate redirection of leaking light rays back to the upper (front) face for extraction by the extraction elements.

FIG. 8D is a sectional view of waveguide optic 300. Each light extraction element 316 includes the front, light extraction face 316A and the rear face 316B. The front faces 316A are disposed an angle θ with respect to the recess floor, the angle θ being about 90 degrees (+/−5 degrees). The front faces 316A facilitate backward light extraction while the rear surfaces 316B curve, taper, or angle away from the recess floor 312. Each light redirection element 324 includes opposing light redirecting surfaces and that taper or curve towards the light extraction face 308. Incoming light $L_I$ enters the optic 300 proximate the light coupling region 318 and is extracted in a direction that is substantially orthogonal to the $L_I$. Some of the incoming light $L_I$ may escape from the coupling zone and be reflected in slow angles by reflective sleeves (FIG. 3D) and guided into the optic 300. Eventually, the light $L_I$ is extracted and/or redirected and then extracted via extraction members and facets in a wide, symmetric distribution. Extracted light $L_E$ is substantially perpendicular to the plane of the light extraction face 308. The incoming light $L_I$ is reflected in slow or high angles near the entrance geometry and extracted at various vertical angles for a wide distribution. In some embodiments, the extracted light $L_E$ is aimed or directed in a preferential direction that is at least partially backwards, back towards the point of entry.

FIG. 8E is a detail plan view of the light coupling region 318 as indicated in FIG. 8C. FIG. 8F is a perspective view of the light coupling region 318. As FIGS. 8E-8F illustrate, the light coupling region 318 comprises a non-linear entrance geometry formed from a plurality of non-linear light input surfaces 320. A plurality of substantially parallel valleys 321 are disposed between the non-linear input surfaces 320. The input surfaces 320 can be substantially smooth or not smooth. As FIG. 8F illustrates, the input surfaces 320 can be texturized or patterned, and, in certain embodiments, are curved, faceted, or have columnar, ribbed faces 323. The columnar faces 323 facilitate separation of the light into two directions and collimate the light.

The waveguide optics, optic assemblies, and lighting devices described herein are configured for use in outdoor lighting products, such as in outdoor lighting fixtures (e.g., street lighting fixtures, parking lot lighting fixtures, roadway lighting fixtures, etc.). Such devices and fixtures set forth herein emit light having a high output flux of at least about 24,000 lumens or more (i.e., 24,000-50,000 lumens or any subrange therebetween, such as 24,000-32,000 lumens, 32,000-35,000 lumens, etc.). The output flux range(s) may vary, where desired, by changing out the LED light sources and/or increasing electrical power.

Further, the devices and fixtures described herein emit light having a color temperature of about 2500-6000 Kelvin (K), or any subrange therebetween (e.g., 3000-5000 K, 3500-4500 degrees, etc.).

Moreover, the devices and fixtures described herein exhibit an efficacy of at least about 90 lumens per watt (LPW), at least 100 LPW, at least 110 LPW, at least 115 LPW, or more than 115 LPW (e.g., 116-120 LPW). Further, the waveguide optics employed in the devices and fixtures described herein exhibit an overall efficiency (i.e., light extracted from the waveguide optic divided by light injected into the waveguide optic) of at least about 90 percent. A color rendition index (CRI) of at least about 80, and in some embodiments at least 85 or 90, is attained by the devices and fixtures set forth herein.

Additional features, elements, architectures, and/or operational principles of various waveguide optics are described in U.S. patent application Ser. No. 14/657,988 entitled "Luminaire Utilizing Waveguide" by Wilcox et al. and U.S. patent application Ser. No. 15/192,979 entitled "Luminaires Utilizing Optical Waveguide" by Lim et al., the disclosures of each which are incorporated herein by reference in the entirety.

The optic housing (i.e., 30, FIG. 2A) employed by devices and fixtures described herein can be utilized as a standard or universal optic housing for one or more luminaire constructions. Specific lighting distribution of the optic assembly is controlled by selection of the waveguide optic (i.e., 70, 100, 200, and 300) and optical insert.

Figure 9A:
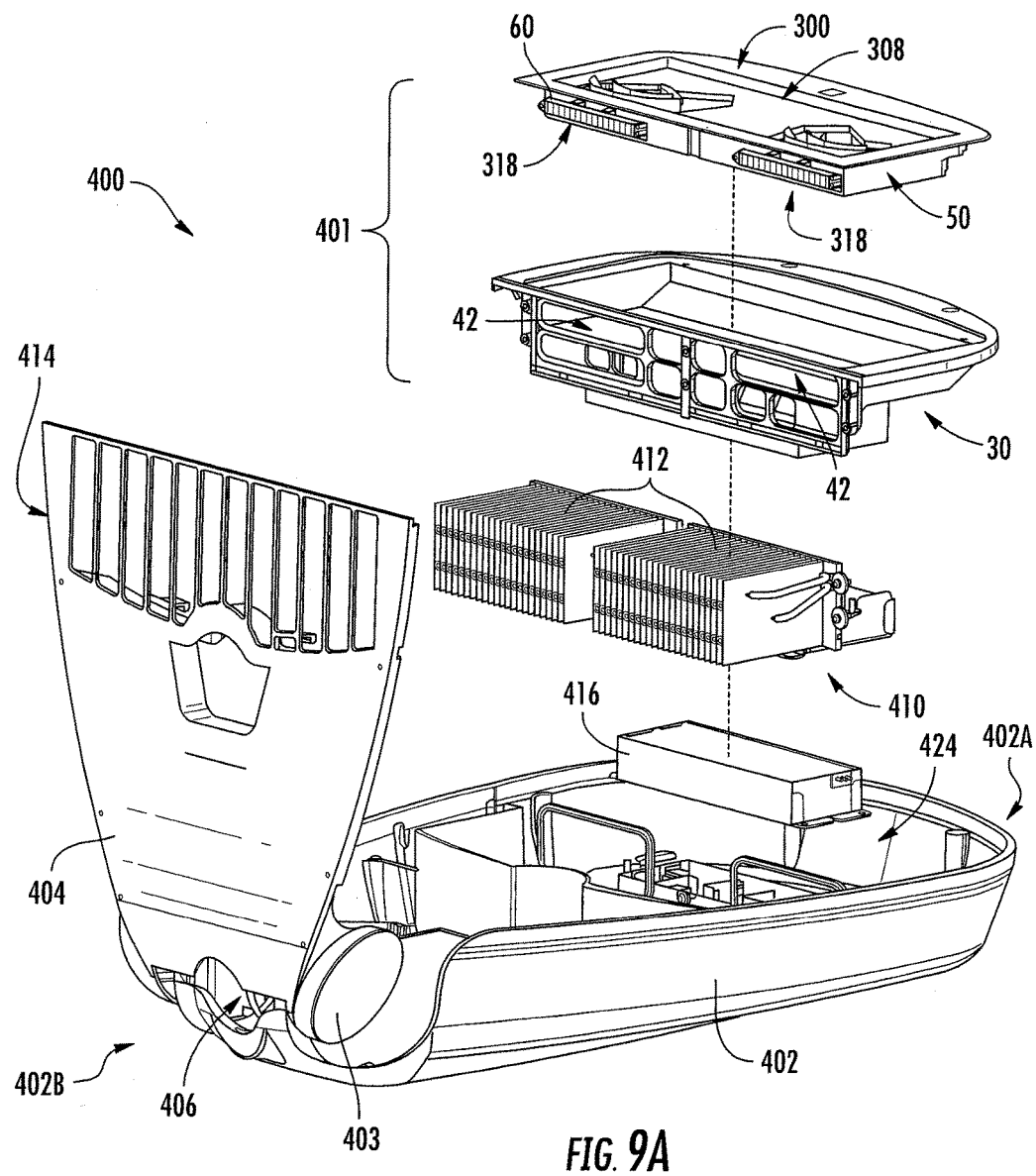
FIGS. 9A-9C illustrate integration of an optic assembly into a luminaire according to some embodiments.
Figure 9B:
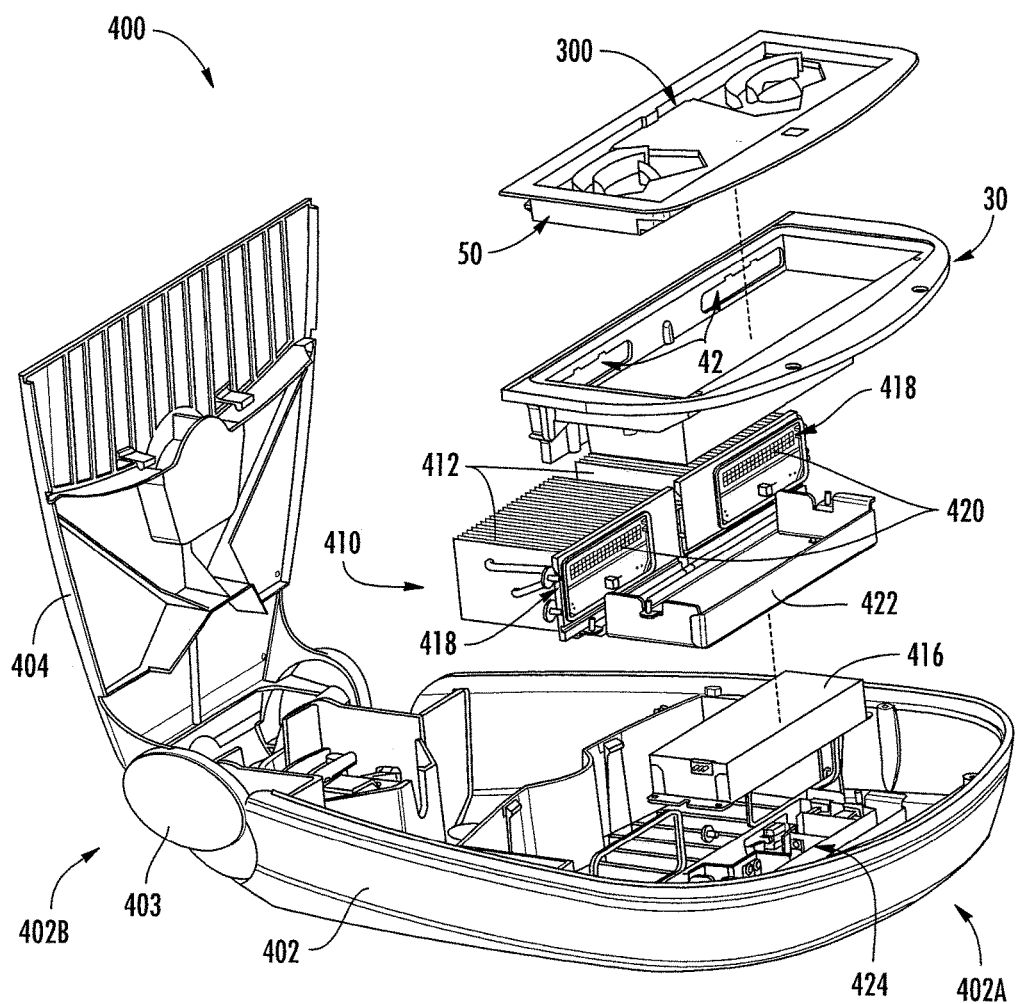
Figure 9C:
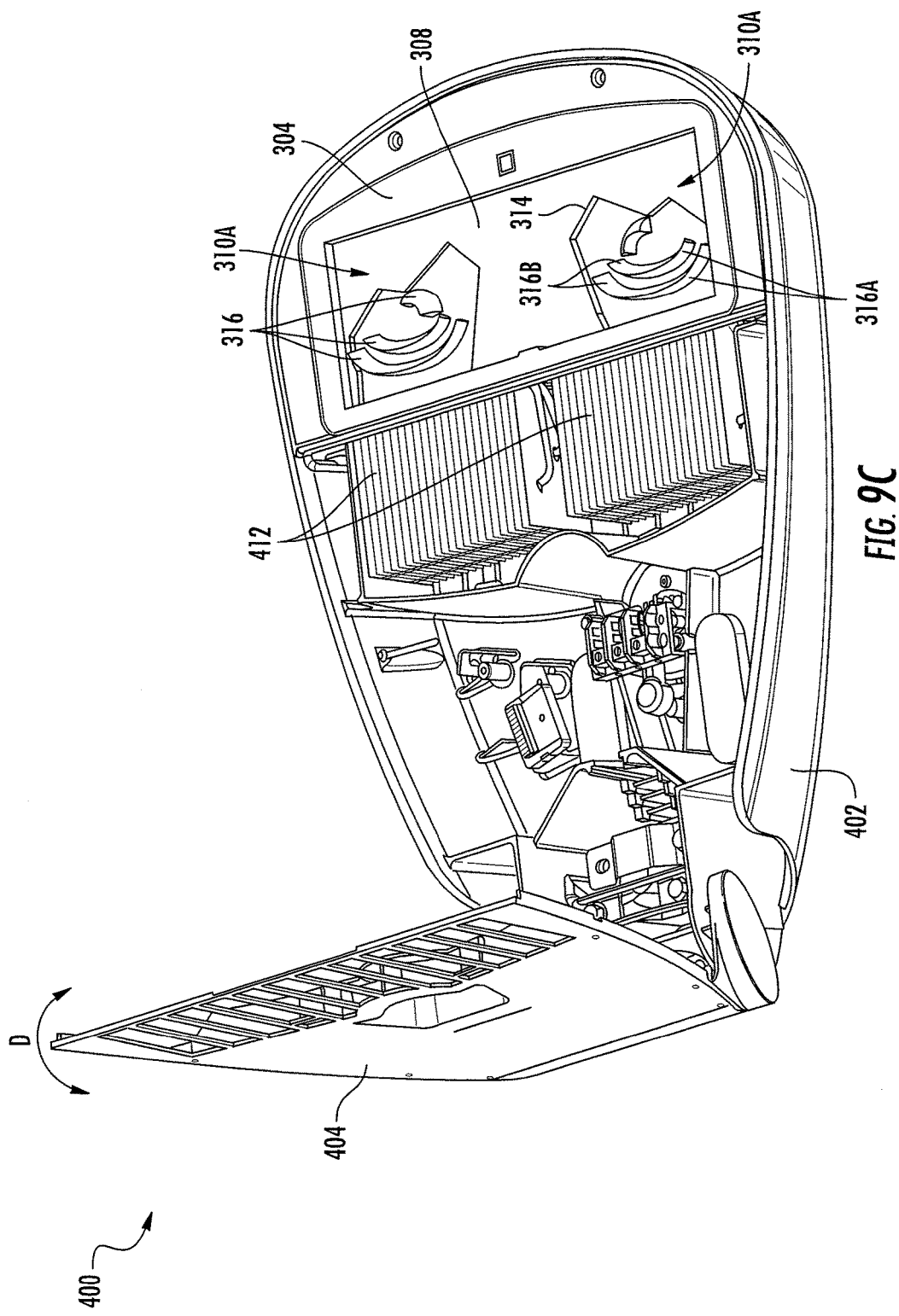

FIGS. 9A-9C illustrate integration of an optic assembly 401 into a luminaire fixture 400 according to one embodiment. The luminaire fixture 400 comprises a housing 402. The housing may be formed from a high strength, lightweight composition such as a UV stabilized polymer for improved weathering and durability. The housing 402 comprises a first end 402A and a second end 402B. The optic assembly 401 is located proximate the first end 402A of the housing and a mounting portion 406 is located proximate the second end 402B.

The mounting portion 406 is configured to couple the fixture 400 to a pole, post or other support structure. The housing includes a door 404 that facilitates tool-less access and entry to portions of the housing 402, for example, for facilitating easy access to and/or the servicing or replacement of the optic assembly 401, or portions thereof. The door 404 is configured to move (e.g., via pivoting) around a point 403 to open and close the housing.

A compartment 424 is disposed in the housing 402. The compartment 424 is configured to receive the optic assembly 401. The optic assembly is comprised of a waveguide optic 300 (described in FIGS. 8A-8D) positioned in an optical insert 50. The optic 300 and insert 50 will be positioned in and retained by the optic housing 30. Each light coupling region 318 of optic assembly 401 is configured to couple to an LED assembly 410. Individual LEDs (i.e., 420, FIG. 9B) face the light coupling regions 318 and inject light into the optic assembly 401 in a direction that is substantially orthogonal to the plane of the light extraction face 308.

The LED assembly 410 is comprised of a plurality of LED light sources (i.e., 420, FIG. 9B) and heatsinks 412 for dissipating heat from the LED assembly 410. Vents 414 are provided in the housing 402 for releasing the heat extracted from the LED assembly 410. The LED assembly 410 is electrically connected to a driver 416, which electrically activates the LEDs and causes the LEDs to generate light.

Referring to FIG. 9B, the LED assembly 410 further comprises a driver enclosure 422 for retaining the driver 416 and associated circuitry. Associated electronics are positioned in the compartment 424 adjacent and/or below portions of the optic assembly 401. The LED assembly 410 comprises an array of LEDs 420 that interface with a side of the waveguide optic 401. The LEDs 410 are provided in an array 418, and in some embodiments are disposed on or over a printed circuit board (PCB). In this embodiment, each array 418 comprises three rows of 18 LEDs. Employing multiple arrays 418 facilitates a high output flux of at least 24,000 lumens, and in some aspects at least 32,000 lumens. FIG. 9C illustrates an assembled luminaire fixture 400. The door 404 can move in the directions D to open and close the fixture.

LEDs 420 are light sources comprised of packaged LED chip(s) or unpackaged LED chip(s) (i.e., a chip on board (COB) array). LEDs 420 can comprise the same or different types and/or configurations. The LEDs 420, for example, can be monochromatic or any desired color combination. The LEDs 420 can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc.

The LEDs 420 can comprise phosphor-converted white or color LED chips and/or bare LED chips of the same or different colors mounted directly on a PCB and/or packaged phosphor-converted white or color LEDs mounted on the printed circuit board, such as a metal core printed circuit board or FR4 board. In some embodiments, the LEDs 420 can be mounted directly to the heat sink 412 or another type of board or substrate. Depending on the embodiment, LED arrangements or lighting arrangements using remote phosphor technology can be employed as would be understood by one of ordinary skill in the art, and examples of remote phosphor technology are described in U.S. Pat. No. 7,614,759, assigned to the assignee of the present subject matter and hereby incorporated by reference.

In those cases where a soft white illumination with improved color rendering is to be produced, the LEDs 420 (i.e., chips, elements, modules, or a plurality of such elements or modules) may include one or more blue shifted yellow LEDs and one or more red or red/orange LEDs as described in U.S. Pat. No. 7,213,940, assigned to the assignee of the present subject matter and hereby incorporated by reference.

The LEDs 420 may be disposed in different configurations and/or layouts along one or more edges of the waveguide body, as desired. Different color temperatures and appearances could be produced using other LED combinations of single and/or multiple LED chips packaged into discrete packages and/or directly mounted to a printed circuit board as a chip-on board arrangement. In one embodiment, the light sources can comprise any LED, for example, an XP-Q LED incorporating TrueWhite™ LED technology or as disclosed in U.S. patent application Ser. No. 13/649,067, filed Oct. 10, 2012, entitled "LED Package with Multiple Element Light Source and Encapsulant Having Planar Surfaces" by Lowes et al., (Cree Docket No. P1912US1-7), the disclosure of which is hereby incorporated by reference herein, as developed and manufactured by Cree, Inc., the assignee of the present application. In another embodiment, the light sources can comprise XQ-E LEDs developed by Cree, Inc.

Any of the embodiments disclosed herein incorporating LED light sources may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The driver 416 and/or associated circuitry may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein.

A sensor module (not shown) may be positioned on or over the housing for sensing ambient light conditions and/or other conditions including, but not limited to, temperature, humidity, carbon dioxide, carbon monoxide, volatile organic compounds, sound and mechanical vibration and acceleration. The sensor module can also comprise Radio Frequency (RF) communication apparatus. The luminaire, for example, can be part of a wireless distributed lighting network. For example, luminaires of the network may communicate with one another via Institute of Electrical and Electronic Engineers standard 802.15 or some variant thereof. Using a wireless mesh network to communicate between luminaires may increase the reliability thereof and allow the wireless lighting network to span large areas.

Examples of luminaires and wireless network architectures employing RF communication are provided in U.S. Patent Application Ser. No. 62/292,528, titled Distributed Lighting Network referenced above. When RF communication apparatus is included in the sensor module, RF-transmissive materials are can be employed in the construction of luminaire component(s) so as not to interfere with RF transmission or reception.

Luminaire fixtures having the design and construction described in regards to FIGS. 9A-9C can be employed in various applications including roadway lighting, sidewalk lighting and/or parking lot lighting. Additional applications include warehouse or arena lighting as well as aisle lighting.

Various embodiments of the instant subject matter have been described in fulfillment of the various objects set forth herein. It should be recognized that these embodiments are merely illustrative of the principles and aspects of the present subject matter. Numerous modifications and adaptations thereof will be readily apparent to those skilled in the art without departing from the instant disclosure.

The invention claimed is:

1. A lighting device comprising:
an optic housing;
an optical insert positioned in the optic housing; and
a waveguide optic positioned in the optical insert, the waveguide optic comprising a light extraction face and at least two sets of light extraction elements disposed over the light extraction face.

2. The lighting device of claim 1, wherein the two sets of light extraction elements are disposed on opposing sides of an axis of symmetry.

3. The lighting device of claim 1, wherein each set of light extraction elements comprises a plurality of non-linear extraction elements.

4. The lighting device of claim 3, wherein the non-linear extraction elements are arcuate.

5. The lighting device of claim 1, wherein the waveguide optic further comprises a light redirecting face opposite the light extraction face and a plurality of light redirection elements disposed over the light redirecting face.

6. The lighting device of claim 1 further comprising a first light coupling region disposed proximate a first set of light extraction elements and a second light coupling region disposed proximate a second set of light extraction elements.

7. The lighting device of claim 6, wherein the first and second light coupling regions comprise non-linear entrance geometry.

8. The lighting device of claim 7, wherein portions of the entrance geometry are parabolic or wedge-shaped.

9. The lighting device of claim 8 further comprising a plurality of light emitters facing the entrance geometry.

10. The lighting device of claim 9, wherein the light emitters are light emitting diodes (LEDs).

11. The lighting device of claim 10, wherein the LEDs are configured to emit red, blue, or green light.

12. The lighting device of claim 7 further comprising a plurality of reflective sleeves covering portions of the first and second light coupling regions.

13. The lighting device of claim 12, wherein the reflective sleeves are specularly reflective.

14. The lighting device of claim 12, wherein the reflective sleeves comprise a textured surface.

15. The lighting device of claim 1, wherein the optical insert comprises a plurality of reflective sidewalls configured to redirect light emitted from the waveguide optic to provide peak emission from the lighting device at angles greater than 60 degrees relative to nadir.

16. The lighting device of claim 15, wherein the one or more reflective sidewalls are specularly reflective.

17. The lighting device of claim 15, wherein the one or more sidewalls comprise a plurality of sidewall apertures by which the waveguide optic interfaces with a light source.

18. The lighting device of claim 15, wherein the optical insert further comprises a reflective base wall.

19. The lighting device of claim 18, wherein the one or more reflective sidewalls and the reflective base wall define a reflective compartment in which the waveguide optic is positioned.

20. The lighting device of claim 18, wherein the one or more reflective sidewalls are angled with respect to the base wall.

21. The lighting device of claim 18, wherein the reflective sidewalls are terraced.

22. A lighting fixture incorporating the lighting device of claim 1, wherein the lighting fixture is configured to emit a distribution of light that meets the requirements of Type V.

23. The lighting fixture of claim 22, wherein the lighting fixture is configured to output at least 24,000 lumens.

24. A waveguide optic of an optic assembly, the waveguide optic comprising:
a plurality of sidewalls;
a light extraction face disposed between the plurality of sidewalls; and
at least two sets of light extraction elements disposed over the light extraction face, wherein the at least two sets of light extraction elements are disposed on opposing sides of an axis of symmetry.

25. The waveguide optic of claim 24, wherein each set of light extraction elements comprises a plurality of non-linear extraction elements.

26. The waveguide optic of claim 25, wherein the non-linear extraction elements are arcuate.

27. The waveguide optic of claim 24, wherein each set of light extraction elements comprises one or more non-linear extraction elements and one or more linear extraction elements.

28. The waveguide optic of claim 24, wherein the waveguide optic further comprises a light redirecting face opposite the light extraction face and a plurality of light redirection elements disposed over the light redirecting face.

29. The waveguide optic of claim 24 further comprising a first light coupling region disposed proximate a first set of light extraction elements and a second light coupling region disposed proximate a second set of light extraction elements.

30. The waveguide optic of claim 29, wherein the first and second light coupling regions comprise a non-linear entrance geometry.

31. The waveguide optic of claim 24, wherein the waveguide is at least 12 mm thick.

32. The waveguide optic of claim 30, wherein portions of the entrance geometry are parabolic or wedge-shaped.

33. The waveguide optic of claim 30, wherein the entrance geometry comprises a patterned surface.

34. A lighting fixture incorporating the waveguide optic of claim 24, wherein the lighting fixture is configured to emit a distribution of light that meets the requirements of Type V.

35. A waveguide optic of an optic assembly comprising:
a front face comprising at least two sets of light extraction elements;
a rear face opposite the front face;
an entrance geometry defined between the front and rear faces; and
a plurality of light emitting diodes (LEDs) facing the entrance geometry, wherein the LEDs emit light towards the entrance geometry in a first direction, and wherein the light extraction elements extract the light in a second direction that at least partially opposes the first direction.

36. The waveguide optic of claim 35, wherein the entrance geometry comprises a plurality of columnar facets configured to deflect light into a waveguide body of the waveguide optic.

37. The waveguide optic of claim 35, wherein a first row of linearly-arrayed LEDs couples to the optic waveguide proximate a horizontal plane at a center of the waveguide.

38. The waveguide optic of claim 37, wherein the first row of linearly-arrayed LEDs coupled the optic waveguide proximate the horizontal plane is offset relative to a vertical plane at the center of the waveguide.

39. The waveguide optic of claim 35, wherein a plurality of linearly-arrayed LEDs couple to the entrance geometry.

40. The waveguide optic of claim 36, wherein the columnar facets are coupled to at least two differently colored LEDs.

41. The waveguide optic of claim 36, wherein each facet has an asymmetric surface.

42. The waveguide optic of claim 41 further comprising multiple entrance geometries, and wherein each entrance geometry aligns with a sidewall aperture of an optic insert that houses the waveguide optic.

43. A waveguide optic of an optic assembly comprising:
a front face comprising a plurality of light extracting elements;
a rear face comprising a plurality of light redirecting facets;
an entrance geometry defined between the front and rear faces; and
a plurality of light emitting diodes (LEDs) facing the entrance geometry and emitting light;
wherein the entrance geometry is configured to separate the light into at least a first portion and a second portion, the first portion of light being directly extracted from the waveguide optic by one of the light extracting elements and the second portion of light being redirected by at least one of the light redirecting elements prior to extraction by one of the light extracting elements, and
wherein the first or second portions of light are extracted at least partially backwards in a direction towards entrance geometry.

44. The waveguide optic of claim 43, wherein the light extracting elements are non-linear.

45. The waveguide optic of claim 43, wherein the light extracting elements have a sweep feature with a profile of at least one curved surface.

46. The waveguide optic of claim 43, wherein the light redirecting elements are non-linear.

47. The waveguide optic of claim 43, wherein the light redirecting elements have a sweep feature with a profile of at least one curved surface.

48. The waveguide optic of claim 43, wherein the light extracting and redirecting elements have a pair relation for light cascading prior to extraction toward entrance geometry.

49. The waveguide optic of claim 43, wherein the entrance geometry comprises a plurality of columnar facets configured to deflect light into a waveguide body of the waveguide optic.

* * * * *